(12) United States Patent
Velipasaoglu et al.

(10) Patent No.: US 11,150,974 B2
(45) Date of Patent: Oct. 19, 2021

(54) ANOMALY DETECTION USING CIRCUMSTANCE-SPECIFIC DETECTORS

(71) Applicant: Lightbend, Inc., San Francisco, CA (US)

(72) Inventors: Omer Emre Velipasaoglu, San Francisco, CA (US); Vishal Surana, Sunnyvale, CA (US); Amit Sasturkar, San Jose, CA (US)

(73) Assignee: Lightbend, Inc., San Francisco, CA (US)

( * ) Notice: Subject to any disclaimer, the term of this patent is extended or adjusted under 35 U.S.C. 154(b) by 42 days.

(21) Appl. No.: 16/382,074

(22) Filed: Apr. 11, 2019

(65) Prior Publication Data

US 2019/0235944 A1 Aug. 1, 2019

Related U.S. Application Data

(63) Continuation of application No. 14/877,923, filed on Oct. 7, 2015, now Pat. No. 10,261,851.

(Continued)

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0751* (2013.01);
(Continued)

(58) Field of Classification Search
CPC .............. G06F 11/079; G06F 11/0709; G06F 11/0772; G06F 11/0787; G06F 11/32; G06F 11/323; G06F 11/34; G06F 11/3452
See application file for complete search history.

(56) References Cited

U.S. PATENT DOCUMENTS 8,407,317 B2 3/2013 Embree et al.
8,984,116 B2 3/2015 Ge et al.
(Continued)

OTHER PUBLICATIONS

"Adaptive Anomaly Identification by Exploring Metric Subspace in Cloud Computing Infrastructures" by Guan and Fu, 2103 IEEE 32nd International Symposium on Reliable Distributed Systems. (Year: 2013).*

(Continued)

*Primary Examiner* — Christopher S McCarthy
(74) *Attorney, Agent, or Firm* — Haynes Beffel & Wolfeld LLP; Ernest J. Beffel, Jr.; Paul A. Durdik

(57) ABSTRACT

The technology disclosed relates to learning how to efficiently display anomalies in performance data to an operator. In particular, it relates to assembling performance data for a multiplicity of metrics across a multiplicity of resources on a network and training a classifier that implements at least one circumstance-specific detector used to monitor a time series of performance data or to detect patterns in the time series. The training includes producing a time series of anomaly event candidates including corresponding event information used as input to the detectors, generating feature vectors for the anomaly event candidates, selecting a subset of the candidates as anomalous instance data, and using the feature vectors for the anomalous instance data and implicit and/or explicit feedback from users exposed to a visualization of the monitored time series annotated with visual tags for at least some of the anomalous instances data to train the classifier.

20 Claims, 24 Drawing Sheets

Related U.S. Application Data

(60) Provisional application No. 62/107,340, filed on Jan. 23, 2015.

(51) Int. Cl.
| | |
|---|---|
| *G06F 11/32* | (2006.01) |
| *G06F 11/34* | (2006.01) |
| *H04L 12/24* | (2006.01) |
| *G06F 11/30* | (2006.01) |
| *H04L 12/26* | (2006.01) |

(52) U.S. Cl.
CPC ...... *G06F 11/0772* (2013.01); *G06F 11/0787* (2013.01); *G06F 11/32* (2013.01); *G06F 11/323* (2013.01); *G06F 11/34* (2013.01); *G06F 11/3452* (2013.01); *H04L 41/147* (2013.01); *H04L 41/16* (2013.01); *H04L 41/5025* (2013.01); *G06F 11/3006* (2013.01); *G06F 11/3409* (2013.01); *H04L 41/064* (2013.01); *H04L 41/142* (2013.01); *H04L 43/045* (2013.01)

(56) References Cited

U.S. PATENT DOCUMENTS

| | | | |
|---|---|---|---|
| 9,130,860 B1* | 9/2015 | Boe | G06F 16/252 |
| 9,471,778 B1 | 10/2016 | Seo et al. | |
| 9,501,785 B2 | 11/2016 | Dewan et al. | |
| 9,558,056 B2 | 1/2017 | Sasturkar et al. | |
| 10,445,311 B1* | 10/2019 | Saurabh | G06F 16/2365 |
| 2003/0104394 A1 | 6/2003 | Dai et al. | |
| 2003/0225876 A1 | 12/2003 | Oliver et al. | |
| 2004/0046763 A1 | 3/2004 | Ball | |
| 2005/0188240 A1 | 8/2005 | Murphy et al. | |
| 2005/0219151 A1 | 10/2005 | Li et al. | |
| 2008/0155335 A1 | 6/2008 | Klein et al. | |
| 2010/0027432 A1* | 2/2010 | Gopalan | H04L 41/142 370/252 |
| 2010/0128600 A1 | 5/2010 | Srinivasmurthy et al. | |
| 2010/0280985 A1* | 11/2010 | Duchon | G06Q 10/10 706/52 |
| 2013/0055020 A1 | 2/2013 | Krishnan et al. | |
| 2013/0110761 A1* | 5/2013 | Viswanathan | G06N 20/00 706/52 |
| 2014/0129876 A1* | 5/2014 | Addepalli | G06F 11/0709 714/37 |
| 2014/0173336 A1 | 6/2014 | Bennah et al. | |
| 2014/0324862 A1 | 10/2014 | Bingham et al. | |
| 2015/0033080 A1 | 1/2015 | Lee | |
| 2015/0033084 A1 | 1/2015 | Sasturkar et al. | |
| 2015/0033086 A1 | 1/2015 | Sasturkar et al. | |
| 2015/0067651 A1 | 3/2015 | Hoffmann | |
| 2017/0046127 A1 | 2/2017 | Fletcher et al. | |

OTHER PUBLICATIONS

Google Scholar/Patents—text refined (Year: 2021).*
U.S. Appl. No. 14/877,923—Office Action dated Apr. 5, 2017, 12 pages.
U.S. Appl. No. 14/877,923—Response to Office Action dated Apr. 5, 2017 filed Jul. 5, 2017, 12 pages.
U.S. Appl. No. 14/276,846—Office Action dated Nov. 23, 2015, 13 pages.
U.S. Appl. No. 14/276,826—Office Action dated Jan. 11, 2016, 20 pages.
U.S. Appl. No. 14/276,846—Office Action dated Mar. 28, 2016, 14 pages.
U.S. Appl. No. 14/276,826—Notice of Allowance dated Sep. 21, 2016, 5 pages.
U.S. Appl. No. 14/276,846—Notice of Allowance dated Dec. 16, 2016, 10 pages.
U.S. Appl. No. 14/276,826—Response to Office Action dated Jan. 11, 2016 filed Jul. 11, 2016, 16 pages.
U.S. Appl. No. 14/276,846—Response to Office Action dated Nov. 23, 2015 filed Feb. 23, 2016, 17 pages.
U.S. Appl. No. 14/276,846—Response to Office Action dated Mar. 28, 2016 filed Sep. 28, 2016, 12 pages.
U.S. Appl. No. 14/877,923—Office Action dated Nov. 2, 2017, 17 pages.
U.S. Appl. No. 14/877,923—Response to Office Action dated Nov. 2, 2017, filed Apr. 2, 2018, 16 pages.
U.S. Appl. No. 14/877,923—Office Action dated Jun. 26, 2018, 5 pages.
U.S. Appl. No. 14/877,923—Notice of Allowance dated Nov. 29, 2018, 5 pages.
U.S. Appl. No. 14/877,923—Response to Office Action dated Jun. 26, 2018, filed Sep. 26, 2018, 9 pages.
U.S. Appl. No. 15/494,519—Office Action dated Sep. 21, 2018, 7 pages.

* cited by examiner

700D

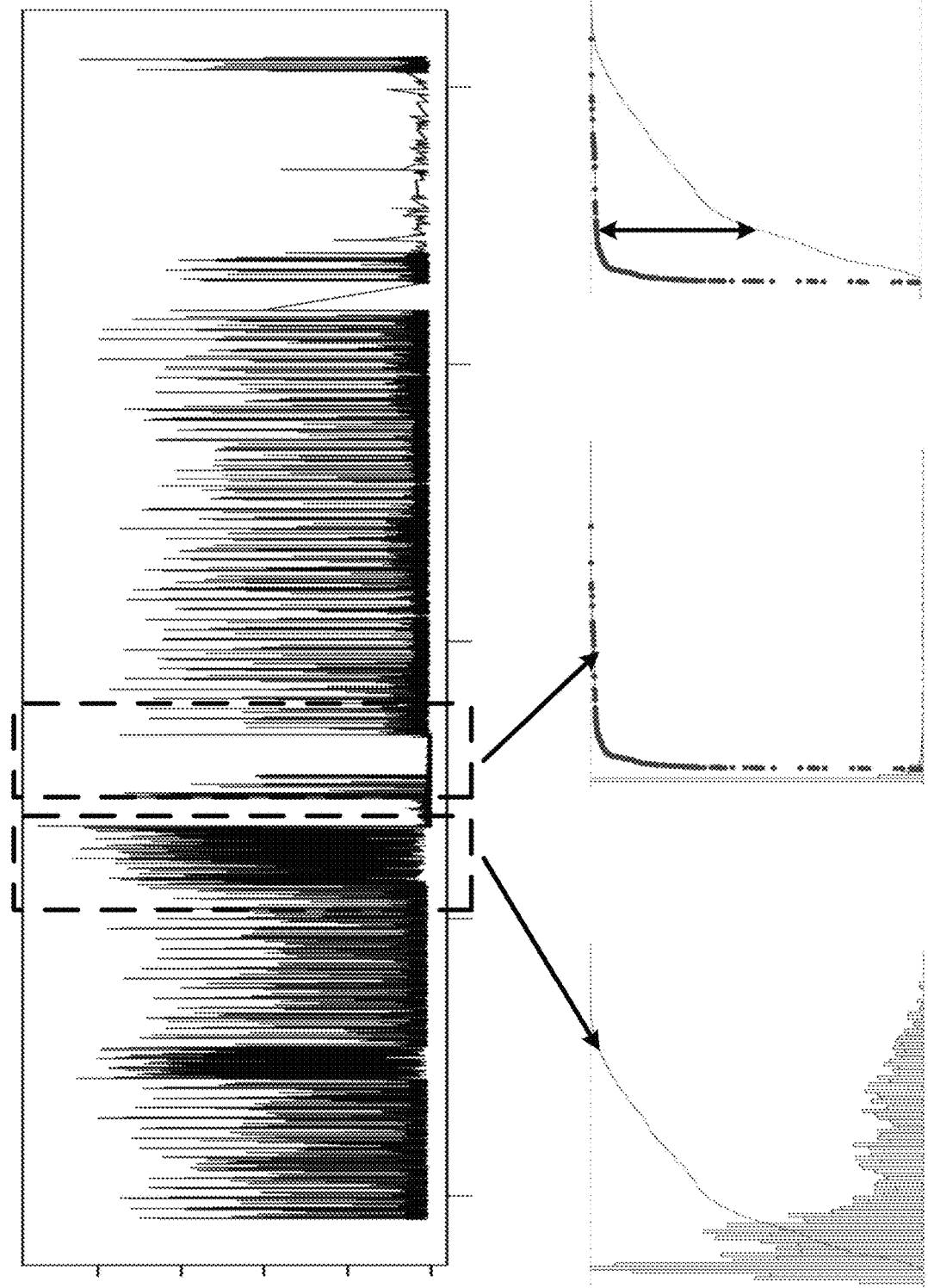

ANOMALY DETECTION USING CIRCUMSTANCE-SPECIFIC DETECTORS

RELATED APPLICATION

This application is a continuation of U.S. patent application Ser. No. 14/877,923, entitled "ANOMALY DETECTION USING CIRCUMSTANCE-SPECIFIC DETECTORS", filed Oct. 7, 2015, which claims the benefit of U.S. Provisional Application No. 62/107,340, entitled "ANOMALY DETECTION USING CIRCUMSTANCE-SPECIFIC DETECTORS", filed Jan. 23, 2015. The provisional and non-provisional applications are hereby incorporated by reference for all purposes.

INCORPORATIONS

Materials incorporated by reference in this filing include the following:

"ORGANIZING NETWORK PERFORMANCE METRICS INTO HISTORICAL ANOMALY DEPENDENCY DATA," U.S. Non. Prov. application Ser. No. 14/276,826, filed May 13, 2014; and "ORGANIZING NETWORK PERFORMANCE METRICS INTO HISTORICAL ANOMALY DEPENDENCY DATA," U.S. Non. Prov. application Ser. No. 14/276,846, filed May 13, 2014.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Modern applications run on distributed computer systems over complex architectures where component and system status is monitored by collecting at regular intervals performance metrics such as CPU, memory, disk and network usage, and system service level agreements (SLAs). Further, the advent of cloud computing and on-line services has led to exponential growth in size and complexity of data centers. This has created unprecedented challenges for system management and monitoring. Given the scale and scope of such large data centers, network operators and monitoring tools are overwhelmed with monitoring and analyzing performance metrics across several thousand network layers and network elements. Currently, network operators and monitoring tools conduct much of the forensic examination when anomalous behaviors have already occurred by examining protocols or log files of past or recent running processes of the affected devices or applications.

It is therefore necessary to automate identification of system behavior changes that are reflected in the performance metrics of various network entities, so as to allow operators to take timely actions that maintain the service level agreements for the data centers. An opportunity arises to increase automation in network monitoring environments. Improved user experience and engagement and higher customer satisfaction and retention may result.

SUMMARY

The technology disclosed relates to learning how to efficiently display anomalies in performance data to an operator. In particular, it relates to assembling performance data for a multiplicity of metrics across a multiplicity of resources on a network and training a classifier that implements at least one circumstance-specific detector used to monitor a time series of performance data or to detect patterns in the time series. The training includes producing a time series of anomaly event candidates including corresponding event information used as input to the detectors, generating feature vectors for the anomaly event candidates, selecting a subset of the candidates as anomalous instance data, and using the feature vectors for the anomalous instance data and implicit and/or explicit feedback from users exposed to a visualization of the monitored time series annotated with visual tags for at least some of the anomalous instances data to train the classifier.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 10A, 10B, 10C and 10D depict one implementation of using a non-parametric test to identify a set of instances in a monitored time series of performance data.

DESCRIPTION

Introduction

Figure 1:
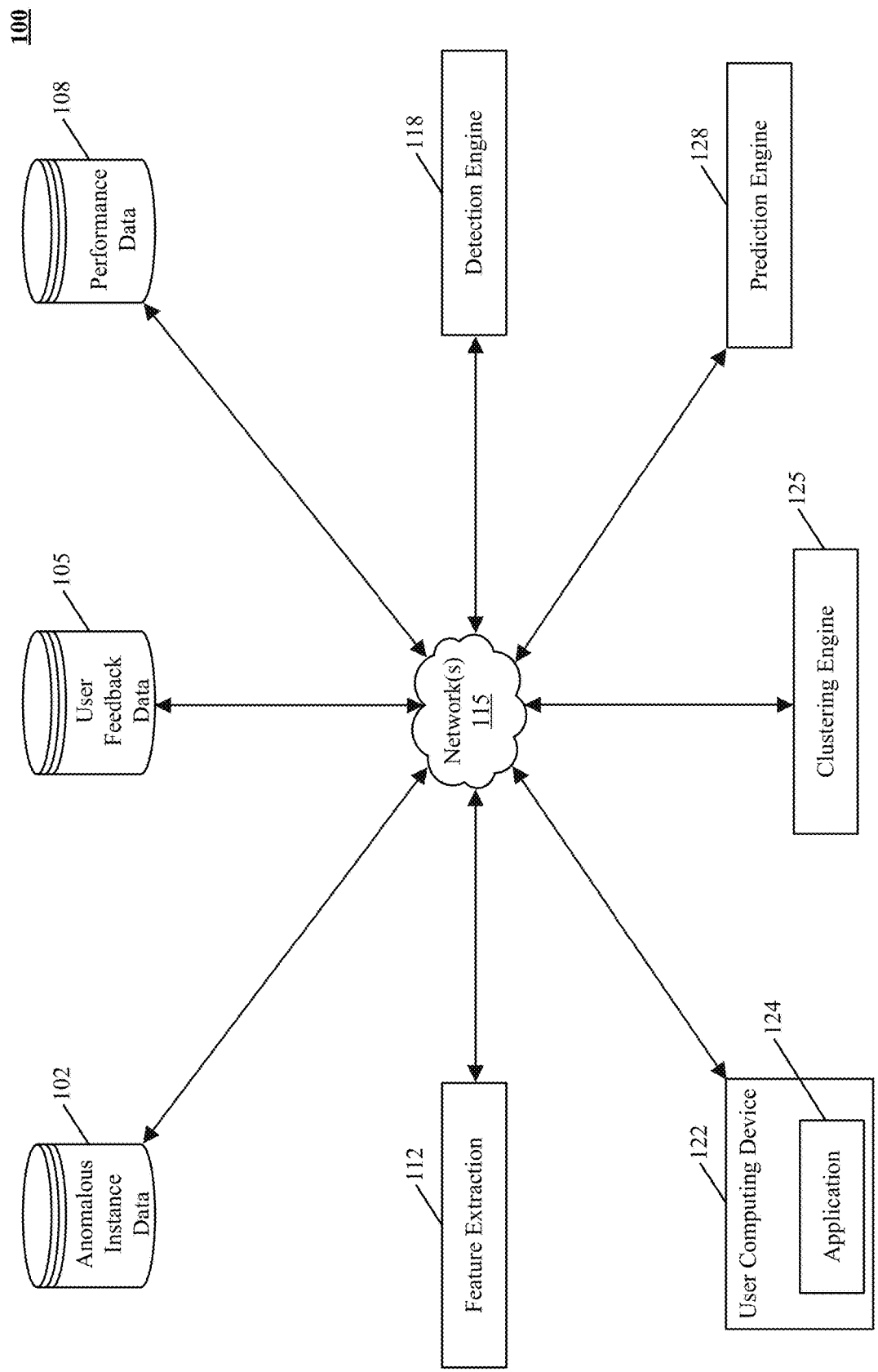
FIG. 1 shows an example environment of anomaly detection using circumstance-specific detectors in a network.

Anomalies refer to any unexpected changes in a data stream. The technology disclosed can be applied to automatically identifying anomalies in data streams that exist in a variety of applications including, information technology (IT) systems, telecommunications systems, financial systems, security trading, banking, business intelligence, marketing, mining, energy, etc. One implementation of the technology disclosed relates to IT systems operations. IT operational data refers to any data that is produced by any human, system (hardware or software), machine, application, software, or component within an IT environment. Some examples of this operational data include metrics (server, network, database, services, hypervisor), alerts, logs, errors, software pushes, or application topology.

Unexpected changes in operational data i.e. anomalies are important for a number of reasons such as understanding the health of the system, alerting for system failures, or identifying the cause and symptoms for failures. One particular use of anomalies is to identify the most likely cause and symptom of system failures, and thereby enable faster resolution of these system failures. Any non-trivial system or data stream can have several anomalies in progress at any given time and manually inspecting all anomalies to identify the actual cause of a failure can be a very time-consuming, cumbersome, and error prone process. Therefore, systems and methods that consistently and automatically identify anomalies for a wide variety of performance metrics can be very useful to network operators and end consumers.

Examples of systems, apparatus, and methods according to the disclosed implementations are described in an information technology context. In other instances, the technology disclosed may be applied to fraud detection, telecommunications systems, financial systems, security trading, banking, business intelligence, marketing, mining, energy, etc. Other applications are possible, such that the following examples should not be taken as definitive or limiting either in scope, context or setting.

The technology disclosed relates to learning how to efficiently display anomalies in performance data to an operator. The technology disclosed can be implemented in the context of any computer-implemented system including an on-demand database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

As used herein, a given signal, event or value is "based on" a predecessor signal, event or value of the predecessor signal, event or value influenced by the given signal, event or value. If there is an intervening processing element, step or time period, the given signal, event or value can still be "based on" the predecessor signal, event or value. If the intervening processing element or step combines more than one signal, event or value, the signal output of the processing element or step is considered "based on" each of the signal, event or value inputs. If the given signal, event or value is the same as the predecessor signal, event or value, this is merely a degenerate case in which the given signal, event or value is still considered to be "based on" or "dependent on" the predecessor signal, event or value. "Responsiveness" of a given signal, event or value upon another signal, event or value is defined similarly.

Anomaly Detection Environment

FIG. 1 shows an example environment 100 of anomaly detection using circumstance-specific detectors in a network. FIG. 1 includes an anomalous instance data store 102, user feedback data store 105, and performance data store 108. FIG. 1 also shows feature extraction engine 112, detection engine 118, clustering engine 125, prediction engine 128, user computing device 122, application 124, and network(s) 115. In other implementations, environment 100 may not have the same elements or components as those listed above and/or may have other/different elements or components instead of, or in addition to, those listed above, such as a baseline data store, crowd sourced data store, or assembly engine. The different elements or components can be combined into single software modules and multiple software modules can run on the same hardware.

Network(s) 115 is any network or combination of networks of devices that communicate with one another. For example, network(s) 115 can be any one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, WiFi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

In some implementations, the engine can be of varying types including a workstation, server, computing cluster, blade server, server farm, or any other data processing system or computing device. The engine can be communicably coupled to the databases via a different network connection. For example, feature extraction engine 112 and detection engine 118 can be coupled via the network 115 (e.g., the Internet), clustering engine 125 can be coupled via a direct network link, and prediction engine 128 can be coupled by yet a different network connection.

In some implementations, data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. In some implementations, user computing device 122 can be a personal computer, laptop computer, tablet computer, smartphone, personal digital assistant (PDA), digital image capture devices, and the like.

Application 124 can take one of a number of forms, including user interfaces, dashboard interfaces, engagement consoles, and other interfaces, such as mobile interfaces, tablet interfaces, summary interfaces, or wearable interfaces. In some implementations, it can be hosted on a web-based or cloud-based privacy management application running on a computing device such as a personal computer, laptop computer, mobile device, and/or any other hand-held computing device. It can also be hosted on a non-social local application running in an on-premise environment. In one implementation, application 124 can be accessed from a browser running on a computing device. The browser can be Chrome, Internet Explorer, Firefox, Safari, and the like. In other implementations, application 124 can run as an engagement console on a computer desktop application.

In one implementation, performance data store 108 stores "network events" data from application servers in a network. A baseline is then automatically constructed that represents the normal operating range for the network traffic and stored in performance data store 108. In one example, performance metrics such as packets per second and connections per second are collected every two minutes to monitor the network traffic during business hours only (e.g. 9:00 am to 5:00 pm). The performance metrics represent the raw data that represent the baseline of network traffic data over the sliding window of time.

Detection engine 118 performs statistical analysis refers to as "transformation" on the raw data and generate a representation of the normal operating range of network traffic during a sliding window of time. In one implementation, transformation is performed using a plurality of circumstance-specific detectors such as moving average, ARIMA forecast, Hidden Markov Model (HMM), and empirical cumulative distribution function (CDF).

In some implementations, detection engine 118 characterizes network events by composing daily cycles of network traffic behavior and automatically generating different profiles of repetitive behavior or normal operating range, referred to as "baseline." In other implementations, detection engine 118 collects statistical samples of traffic data from a multiplicity of resources for different performance metrics by receiving incoming data stream from the resources as a series of data packets.

In some implementations, such samples are exchanged through physical interfaces that employ Layer 2 technologies like Ethernet or Packet Over SONET (POS) framing. In another implementation, detection engine 118 extracts performance metrics for the different resources (routers, switches, firewalls, load balancers, servers, applications) from the received data stream.

Figure 2:
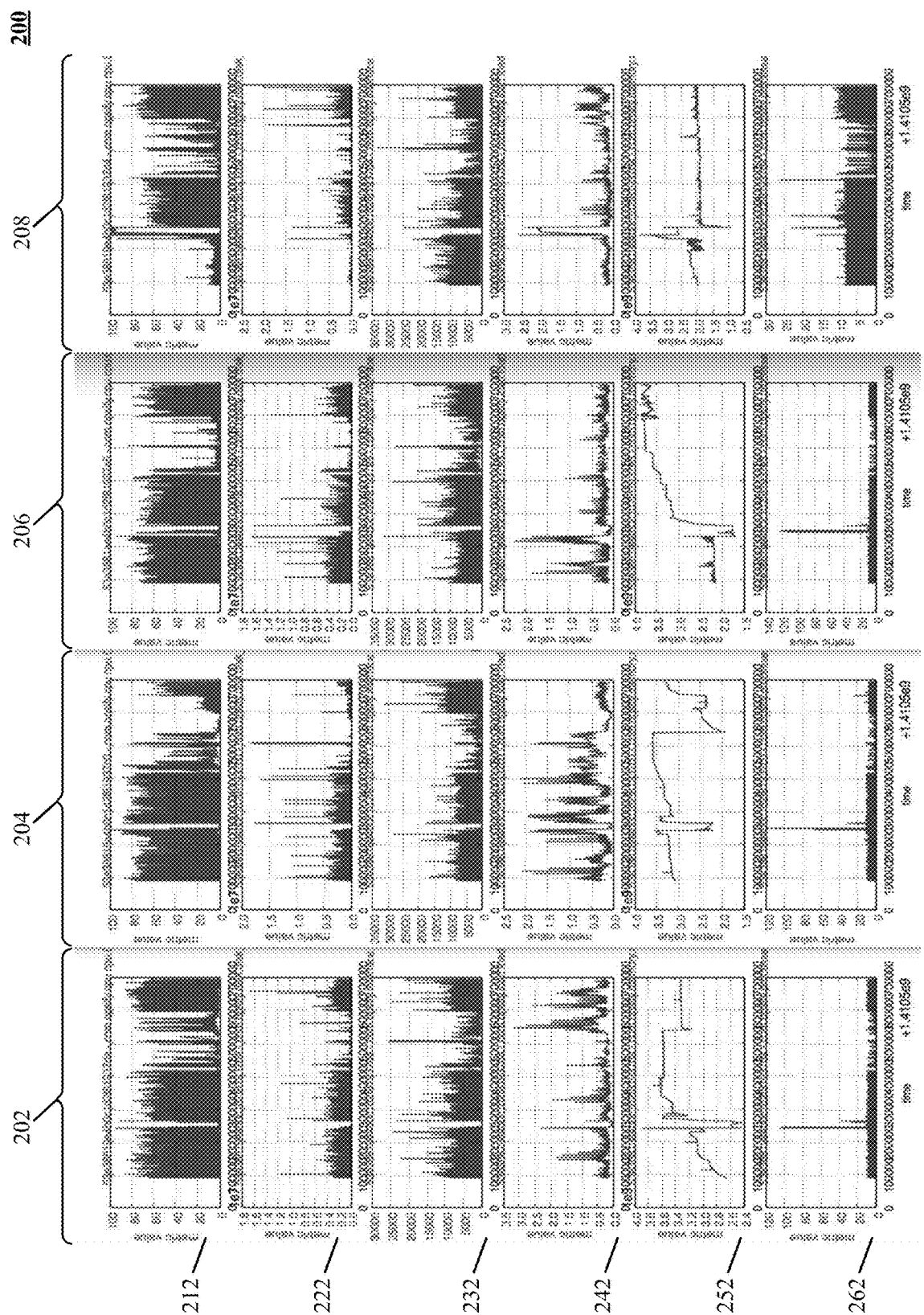
FIG. 2 illustrates a multiplicity of metrics across a multiplicity of resources on a network.

FIG. 2 illustrates a multiplicity of metrics 200 across a multiplicity of resources on a network. In particular, FIG. 2 shows CPU usage 212, disk usage 222, network usage 232, system load 242, memory usage 252, and process fork rate metrics 262, in rows respectively, for four vertical Hadoop nodes 202-208. Examples of other performance metrics include bandwidth, packets per second, connections per second, maximum concurrent connections, bits per second, errors, dropped packets, flows per second, round trip time (RTT), web requests, jitter, or transactions per second.

In addition, detection engine 118 detects anomalous performances referred to as anomalous instances or instances using threshold-based techniques to flag outliers. Such techniques can be parametric or non-parametric, including deviation outliers, order statistics, and Kolmogorov-Smirnov (KS) test. According to such an implementation, detection engine 118 detects anomalies by comparing values of extracted performance metrics with previously calculated current normal thresholds for the performance metrics. If the values are outside their performance metric's normal limits i.e. baseline, anomalies are detected and stored as anomalous instance data 102.

In some implementations, values of extracted performance metrics are compared to service level thresholds that represent the level at which a defined service level for a performance metric is out of bounds. When the values of extracted performance metrics reach or exceed corresponding service level thresholds, service level exceptions are triggered. According to other implementations of the technology disclosed, anomalies are detected using at least one or combination of statistical anomaly detection (unsupervised anomaly detection like multivariate auto regression analysis), data mining, or machine learning based techniques (supervised anomaly detection, semi-supervised anomaly detection).

Once the anomalies are detected, they are grouped into anomaly clusters by the clustering engine 125. In some implementations, clustering engine 125 aggregates performance metrics and clusters the detected anomalies based on spatial network topology. In other implementations, clustering engine 125 clusters detected anomalies based on inter-anomaly time spacing i.e. proximate anomaly occurrence times.

In some implementations, clustering engine 125 detects anomalies at a network-path level or network-wide level by analyzing end-to-end one-way delay, throughput measurement time series, router logs, maintenance activity logs, or command histories. Such anomalies occur as spikes, dips, bursts, persistent variations, or plateau variations in network performance metrics. For instance, anomalies occurring on resources that share common network segments have a certain spatial relation between each other. When anomalies occur on such resources around the same time window, clustering engine 125 groups them into anomaly clusters.

User Feedback

Some implementations include receiving user feedback on the determined anomalous instance data so as to improve the accuracy of circumstance-specific detectors. One implementation includes receiving ratification or rejection from a user on whether a particular determined anomalous instance qualifies as true anomalous data or not. Some examples can include receiving a score, a range of values, stratifying labels like "strong," "weak, or "average," emoticons, likes, stars, thumbs up, bonuses, ratings, badges, one up, plus, share, or other rating metrics. In another example, a user may be presented with three options—"up vote" or "down vote" or "other." An up vote can be interpreted as positive feedback and appreciate the detection strength weight of the corresponding set of circumstance-specific detectors and feature vectors used to identify the anomalous instance. In contrast, down vote can be interpreted as negative feedback and depreciate the detection strength weight of the circumstance-specific detectors and the feature vectors.

In some implementations, determined anomalies are qualified based on implicit user feedback. Examples of implicit user feedback include how the users navigate network monitoring tools and/or how the users curated the presented anomaly results (investigation duration of a particular anomaly result, frequency of investigating a particular anomaly result). The received human feedback is maintained in user feedback data store 122 and automatically updated over time, according to one implementation.

Workflow

The different performance metrics described above have varying shapes and profiles. Consequently, no single anomaly detection technique is successful in identifying anomalies in a variety of performance metrics used across different industries with different parameters. The technology disclosed uses a collection of so-called circumstance-specific detectors that can be applied to a wide variety of performance metrics.

Figure 3:
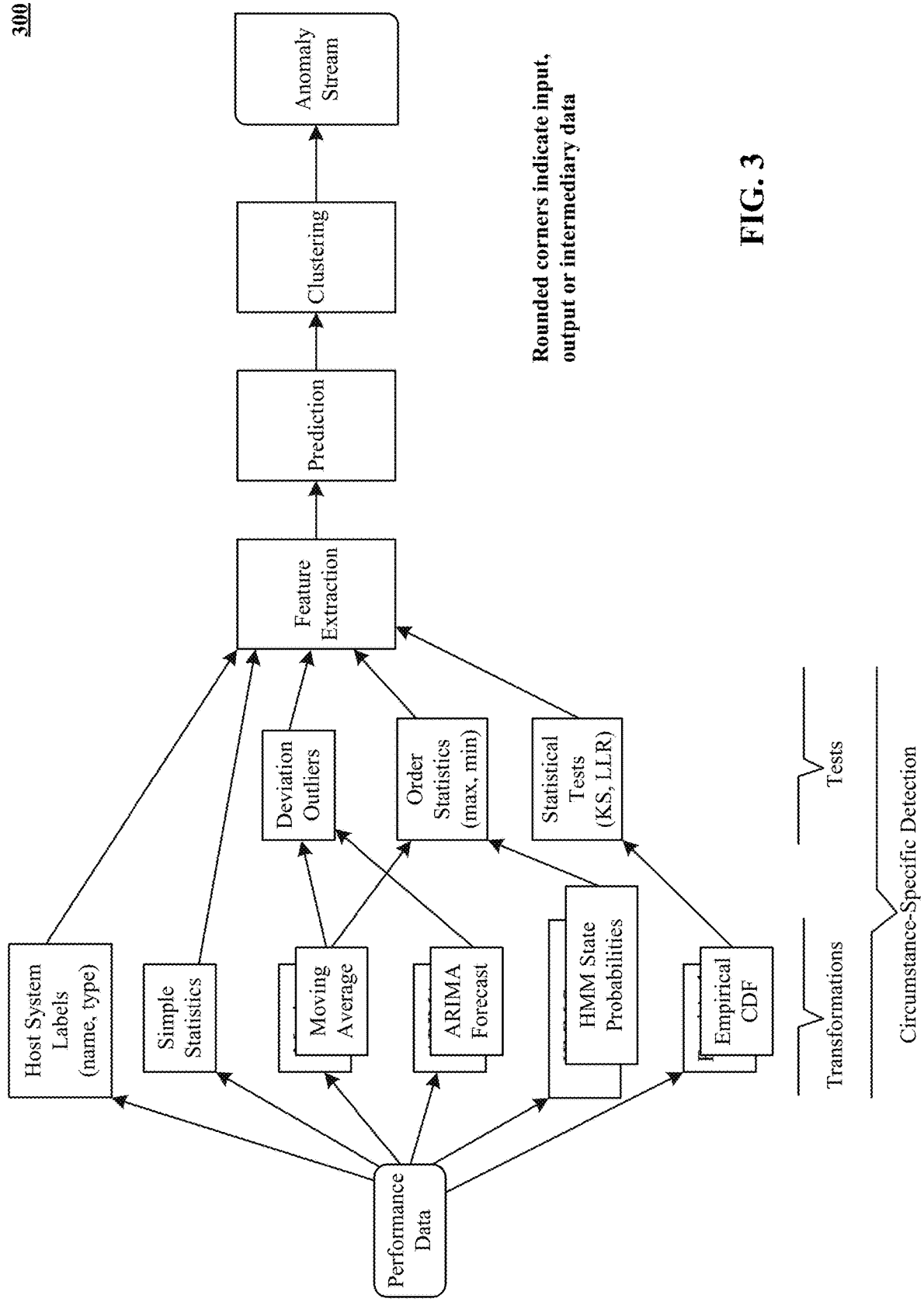
FIG. 3 shows a workflow used to identify anomalies based on circumstance-specific detection.

FIG. 3 shows a workflow 300 used to identify anomalies based on circumstance-specific detection. As shown in FIG. 3, each observation in a sequence performance data based on a performance metric is supplied as input to multiple transformation stages. These transformation stages can include different statistical data analysis techniques such as moving averages, ARIMA models, HMM models, CDF estimators, etc., as described in greater detail later in this application.

Furthermore, for each transformation type, there can be multiple instances with different parameterizations. For instance, there can be two moving average transformers, one with a short window and another with a long window. Similarly, more than one HMM model can be employed with different hidden state numbers. The transforming stages can produce a scalar or a vector output for each observation they process. For example, the moving average can produce an estimate of the average along with an estimate of the standard deviation. In another example, an ARIMA model can produce a forecasted value along with standard error bounds.

The output of each transformation unit is provided to an appropriate test unit. For instance, the output of the moving average transformation can be fed into an outlier detector that thresholds the distance between the performance data observations and the average thereof by a multiple of the corresponding standard deviation.

In a different example, the empirical CDFs can be supplied to a test unit that calculates the Kolmogorov-Smirnov (KS) distance and thresholds. In some implementations, each test unit can be configured with multiple parameters. For example, the KS distance test unit can compare CDFs with two different delays—a short 10 minute delay and a long 1 hour delay.

In some implementations, the transformation units can be cascaded, before testing. For example, the moving average output can be passed through a differentiator to remove trends. For each processed observation of the performance data, a test unit can be chosen to determine a score, which can be further used to identify anomalous instances in the performance data.

In other implementations, the test unit may not determine anything, thus indicating normal observations of the performance data. Each test unit can emit a different score for a different observation, depending on the transformations it receives and its parameter settings.

Traditionally, statistical analysis of performance data for anomaly detection has been restricted to only a few types of signals that require great amount of fine tuning so as to avoid too many false positives and effectively detect anomalies. However, the technology disclosed uses multiple instances of a wide variety of coarsely tuned circumstance-specific detectors, resulting in a parameter sweep across a plethora of performance metrics.

The technology disclosed achieves this by implementing a subsequent machine-learned (ML) stage that combines the evidence from multiple circumstance-specific detectors and predicts future anomalous instances.

In particular, a time series of anomaly event candidates is produced at the feature extraction stage. Further, the feature extraction engine 112 generates feature vectors for the anomaly event candidates, which be used to train a classifier to classify a subset of the anomaly event candidates as anomalous instance data. In some implementations, the feature extraction engine 112 calculates a normalized anomaly score for each of the anomaly event candidates.

In one implementation, the feature extraction engine 112 can use a fixed length time window, such as 10 minutes, within which it can collects all other anomaly event candidates observed within the time window leading to the anomaly event candidate under evaluation along with their scores and the unique IDs of the circumstance-specific detector paths that generated the anomaly event candidates.

Subsequently, a simple feature vector can represent a list of the circumstance-specific detector path IDs mapped to the corresponding scores they produced. In case where a particular circumstance-specific detector path generates multiple anomaly event candidates within a given time window under consideration, a function of the scores and observation times can be used to represent the feature value. In one implementation, such a function can be a maximum score. In another example, such a function can be a time weighted normalized total score.

In another implementation, the feature extraction engine 112 considers performance data collected from the same resources or performance metrics (host, machine, application, service, or agent) as that of the performance data under consideration. For example, when generating feature vectors for anomaly event candidates detected in a CPU usage metric, correlated instances can be found and leveraged in a memory usage metric collected from the same computer. Then, the clustering engine 125 can pool all the anomaly event candidates from all related metrics and resources at the clustering stage to generate feature vectors as described above.

In another implementation, the feature extraction engine 112 leverages all related hosts in a service to collect evidence from an even wider pool of anomaly event candidates. Along with the anomaly event candidates, the feature extraction engine 112 can use other information such as the role of the computer where the observation came from, e.g. a database server, a Hadoop data node, etc. In yet other implementations, the feature extraction engine 112 can also use raw observations, including simple statistics about the observations or static thresholds on the observations, as additional features.

Figure 4:
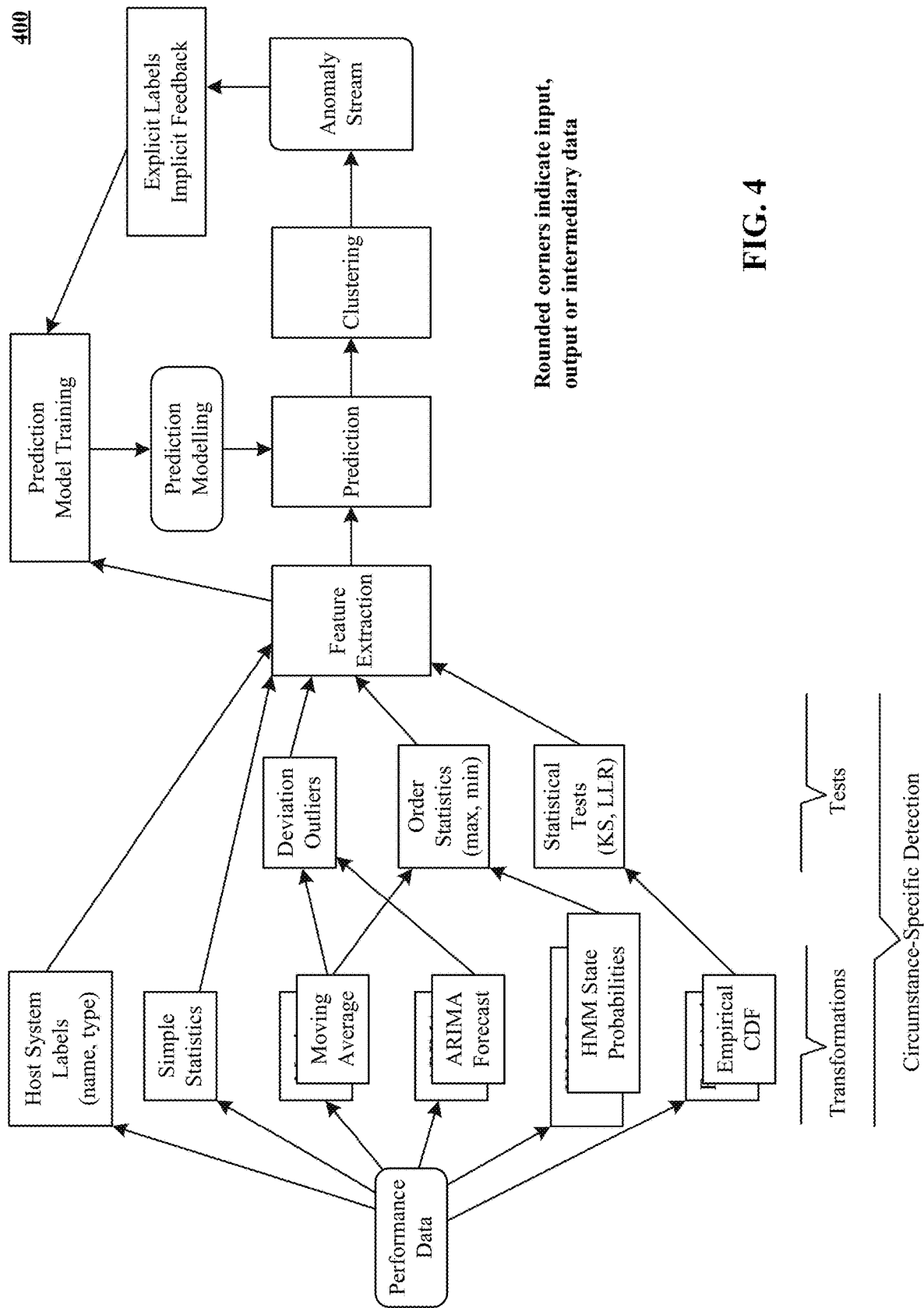
FIG. 4 depicts a workflow used to identify anomalies based on circumstance-specific detection and operator feedback.

FIG. 4 depicts a workflow 400 used to identify anomalies based on circumstance-specific detection and operator feedback. Once the anomaly event candidates are mapped to a feature space, the next task is to learn how to combine all the evidence from the circumstance-specific detectors and determine whether a particular anomaly event candidate should be considered a true anomaly or should be disregarded as a false anomaly.

In some implementations, a supervised or semi-supervised learning method can be used to train a model for the prediction task performed at the prediction stage by the prediction engine 128. In particular, user feedback can be collected for a training set of anomaly event candidates, where the feedback can be explicit binary judgment labels (i.e. true or false anomaly), multi-grade judgment labels (e.g.

strong anomaly, weak anomaly, no anomaly), or multi-class judgment labels (e.g. failure event, software push related event, customer/traffic load event, etc.) The feedback can also be implicit in the way user interacts with the system. For instance, if an anomaly detection system including the circumstance-specific detectors gives the user a ranked list of predicted anomalies, and the user chooses to investigate the second anomaly before the first anomaly, it can be assumed that the second anomaly should have had a higher prediction score than the first. Once the feedback is available, a variety of supervised or semi-supervised learning methods can be used to train a model.

In some implementations, a fully unsupervised learning method is used for the prediction task. Although, the supervised or semi-supervised methods are better suited because what constitutes an anomaly or an interesting event changes from user to user and application to application. It is thus desirable to adapt to users' needs based on feedback from the users.

In other implementations, when explicit used feedback is used, an unsupervised learning stage (e.g. clustering) is employed to process the feature space of anomaly event candidates and to generate a training set that identifies most interesting events for initial labelling of anomalous instances. This is then followed by active learning that selects most interesting events and labels them iteratively, thus minimizing the amount of explicit feedback obtained from the user.

Using this technique, a prediction model is learned for each monitored time series of performance data. Then, in operation, the same circumstance-specific detector and feature vector is used for collecting anomaly event candidates and identifying true anomalies.

Circumstance-Specific Detectors

Figure 5A:
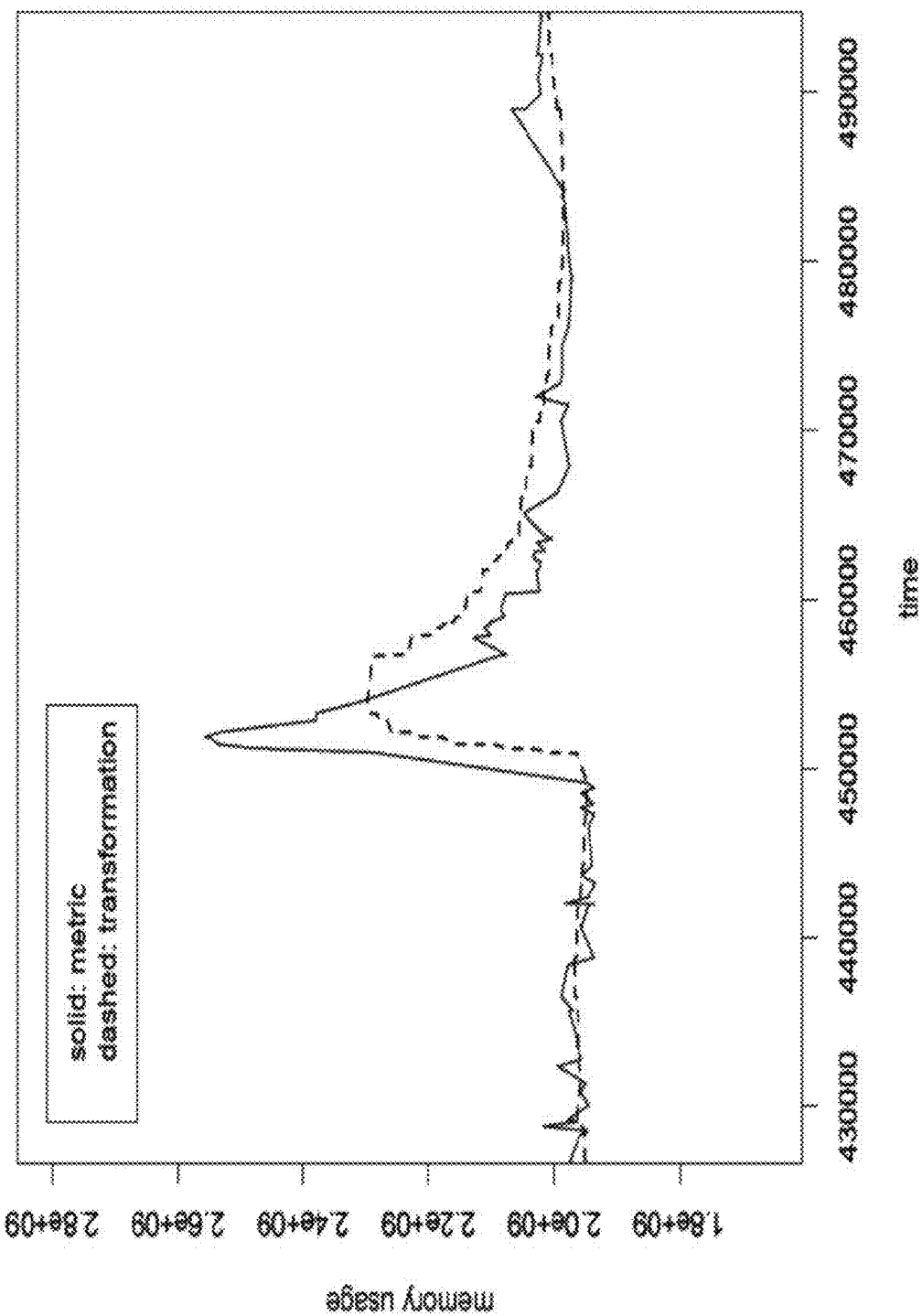
FIGS. 5A and 5B show one implementation of an exponentially weighted moving average trend model that estimates a smoothed average of values in a monitored time series of performance data.
Figure 5B:
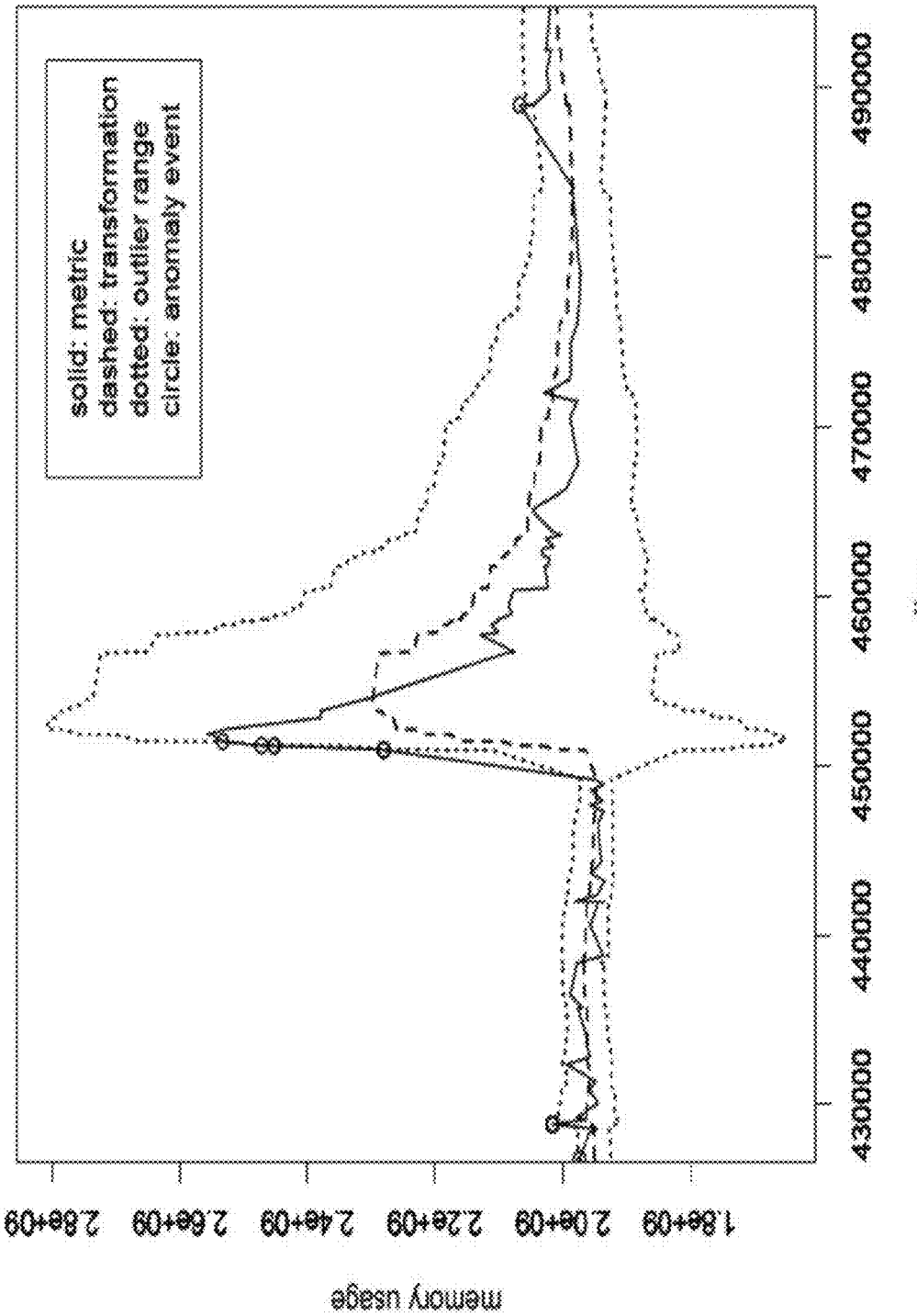

As discussed above, the technology disclosed uses a plurality of circumstance-specific detectors to monitor the performance of a resource on network. FIGS. 5A-B show one implementation of a Exponentially Weighted Moving Average (EWMA) trend model 500A that estimates a smoothed average of values in a monitored time series of performance data. In one implementation, an auto-regressive (AR) model is used to characterize a normal condition of a resource based on different performance metrics.

In addition, performance data is assembled from the resource during operation. Subsequently, the performance data is fit to the AR parametric model, and a EWMA is derived. The EWMA coupled with a deviation outlier test detects if a resource is in normal or abnormal state. Further, a EWMA graphic is generated that distinguishes between normal and abnormal conditions, and between different abnormal conditions referred to as anomalies.

In one implementation, an EWMA is calculated using the following formula:

$$R_t = \alpha D_t + (1-\alpha) R_{t-1},$$

where:

$R_t$ is the EWMA value at the current time t;

$R_{t-1}$ is the EWMA value at time t−1 (e.g., the previous update of the EWMA computation);

α is a variable that determines the weight to assign to previous EWMA values (0<α<1); and Dt refers to the performance metric at time t.

In particular, FIG. 5A show an EWMA 500A that estimates a smoothed average of a time series monitored for a memory usage metric. The monitored time series is depicted with a solid line and the smoothed average is illustrated using a dashed line. FIG. 5B shows one implementation 500B of using the smoothed average to determine instances in the monitored time series of FIG. 5A that fall a predetermined multiple of standard deviations away from the smoothed average and identifying the instances as anomalies. The dotted line represents the outlier range of the standard deviations and the circles identify the anomalous instances not within the standard deviations.

A Hidden Markov Model (HMM) is a stochastic process determined by the two interrelated mechanisms—a Markov chain having a finite number of states, and a set of observation probability distributions, each one associated with a state. At each discrete time instant, the process is assumed to be in a state, and an observation is generated by the probability distribution corresponding to the current state. HMMs are usually trained using the Baum-Welch algorithm specialized expectation maximization technique to estimate the parameters of the model from the training data.

An HMM models a normal process of a resource (host, application, service) behavior over a given period of time. In one implementation, an HMM captures the underlying structure of a monitored resource using the temporal order of system calls generated by the resource process. Once trained, an MINI can be used to discriminate between normal and anomalous instances in sequences of performance data. In some implementations, thresholds are set for "normal" state transition and output probabilities. Then, if an instance is encountered that could only have been produced using below-threshold transitions or outputs, it is flagged as a mismatch.

Figure 6A:
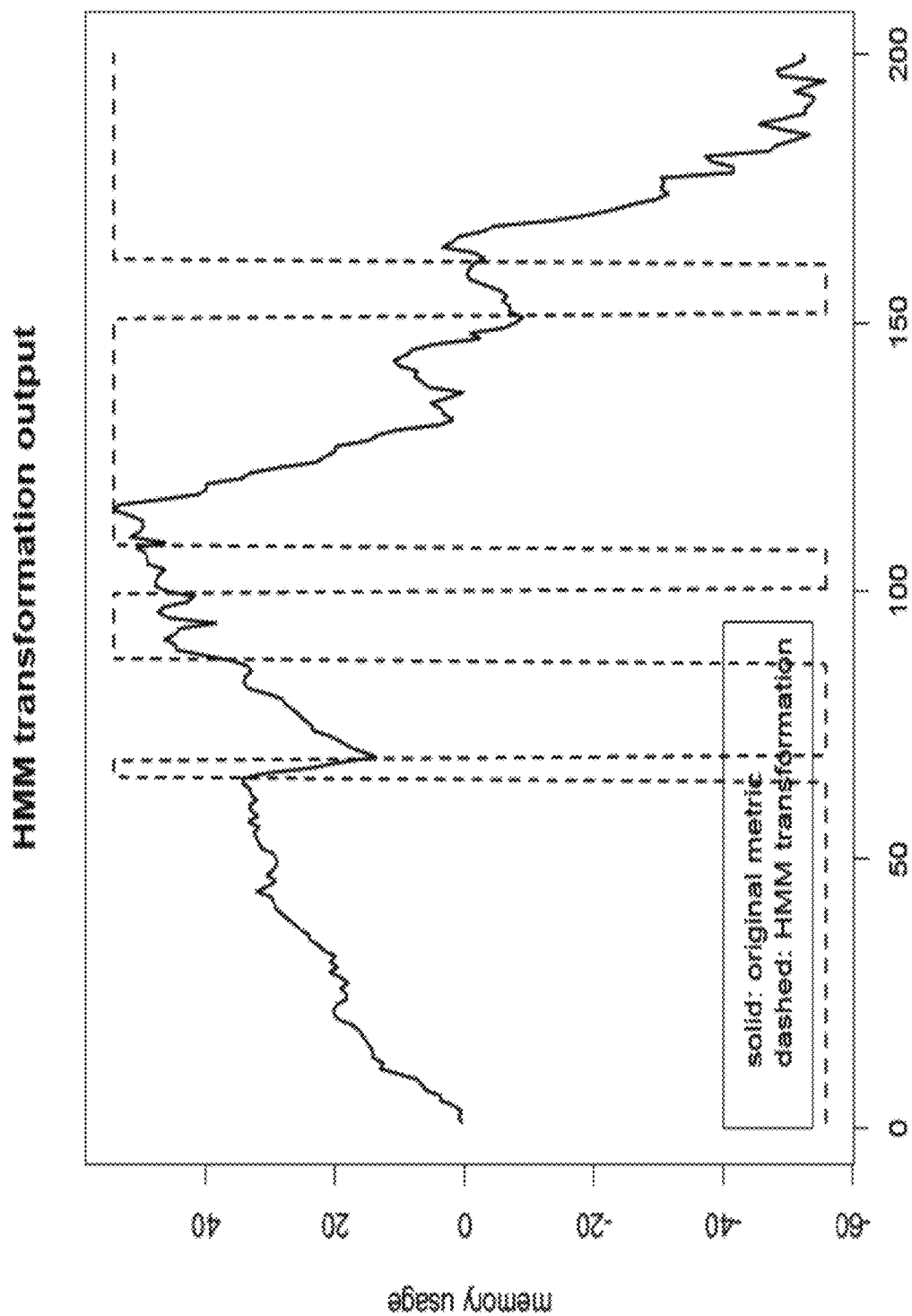
FIGS. 6A and 6B illustrate one implementation of a Hidden Markov Model (HMM) that infers stage changes in a monitored time series of performance data and identifies at least some state changes as anomalies.
Figure 6B:
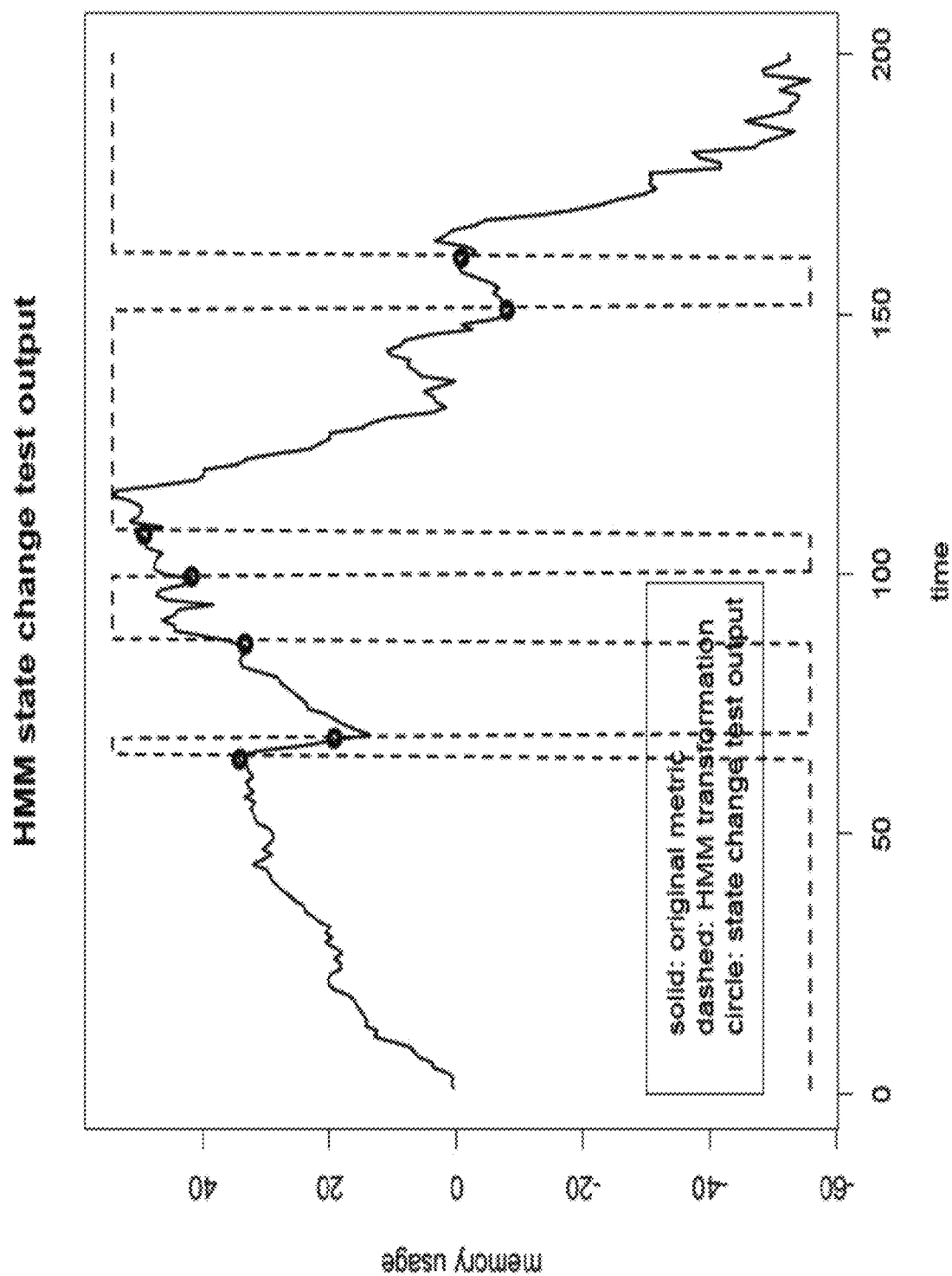

In particular, FIG. 6A illustrates an HMM 600A that infers stage changes in a monitored time series of a memory usage metric. The monitored time series is depicted with a solid line and the HMM transformation is illustrated using a dashed line. In FIG. 6B, an implementation 600B is shown according to which at least some state changes in the monitored time series that cross a certain threshold are identified as anomalies using circles.

Figure 7A:
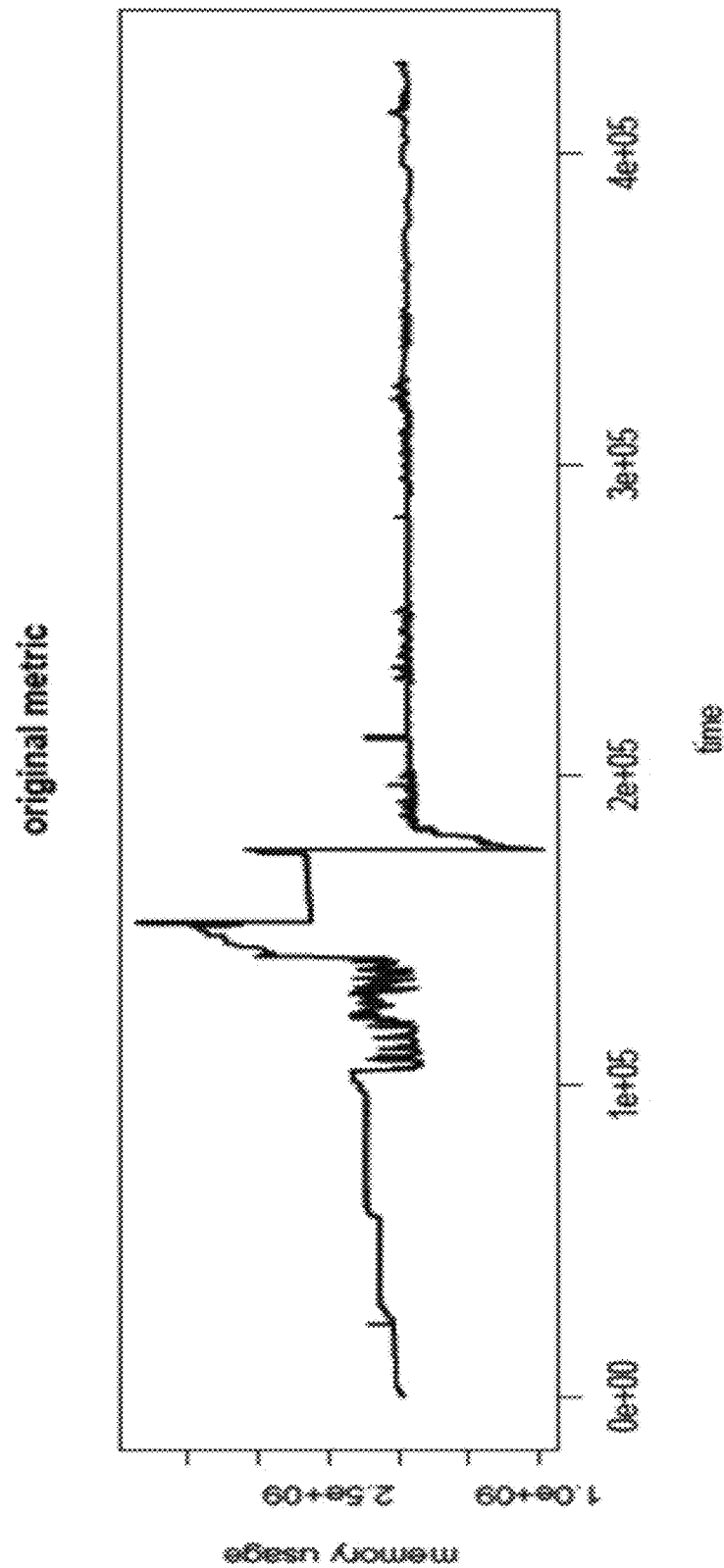
FIGS. 7A, 7B, 7C, 7D, and 7E are one implementation of frequency domain decomposition of a monitored time series of performance data using spectrograms.
Figure 7B:
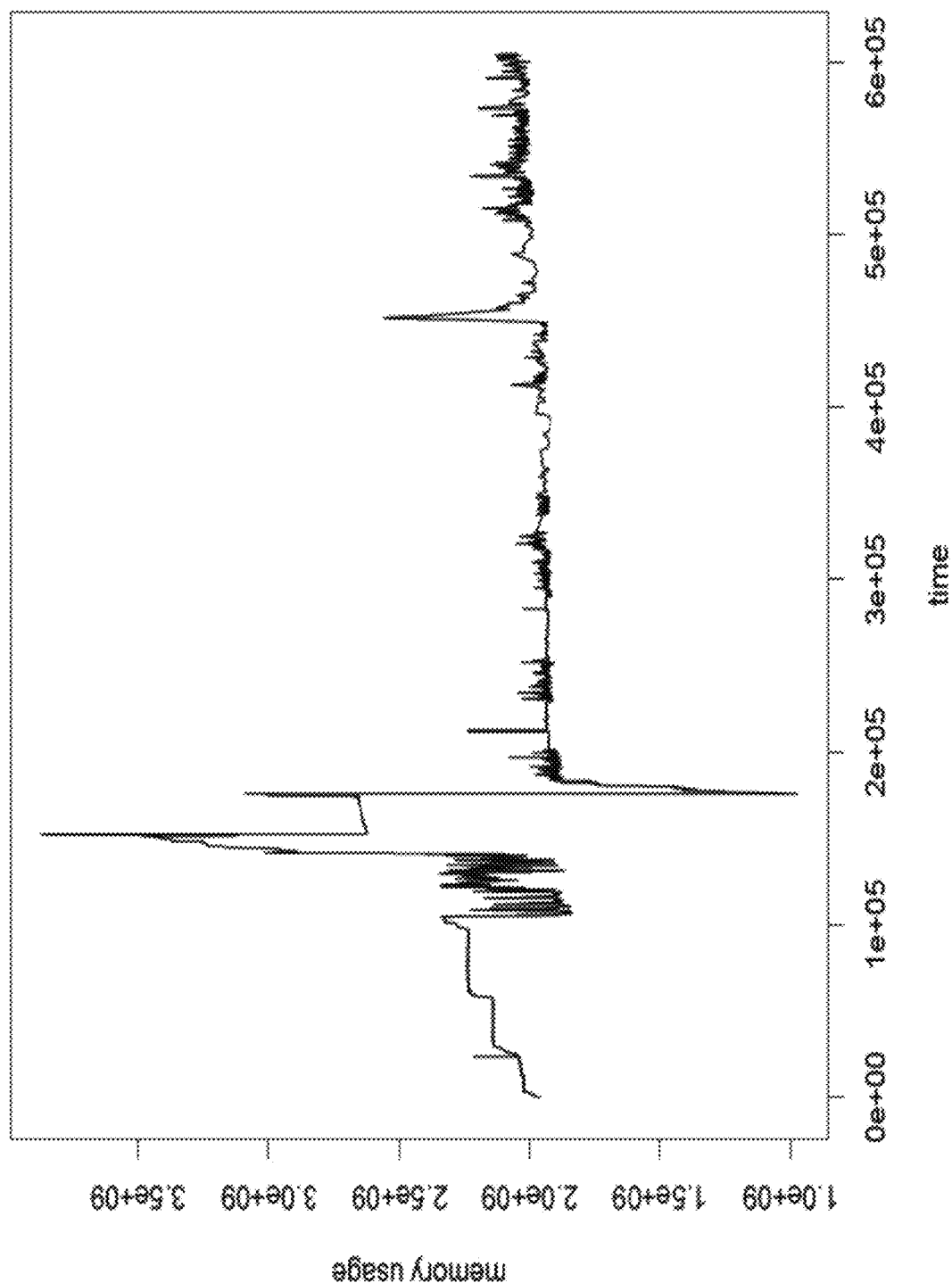
Figure 7C:
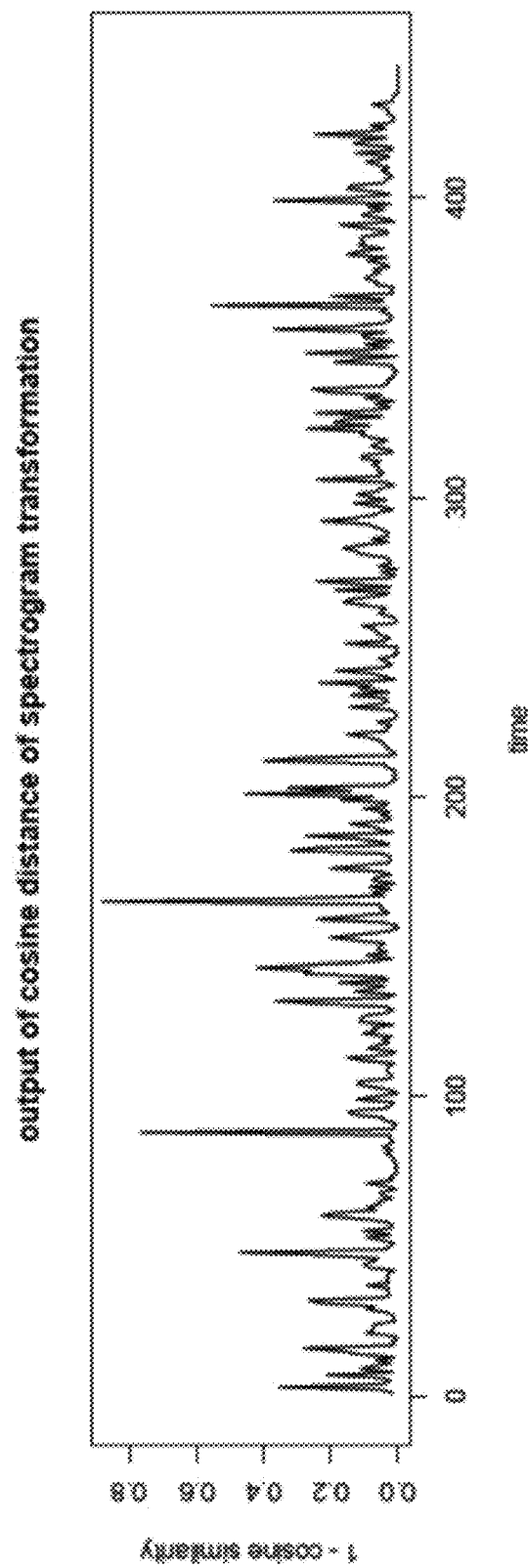
Figure 7D:
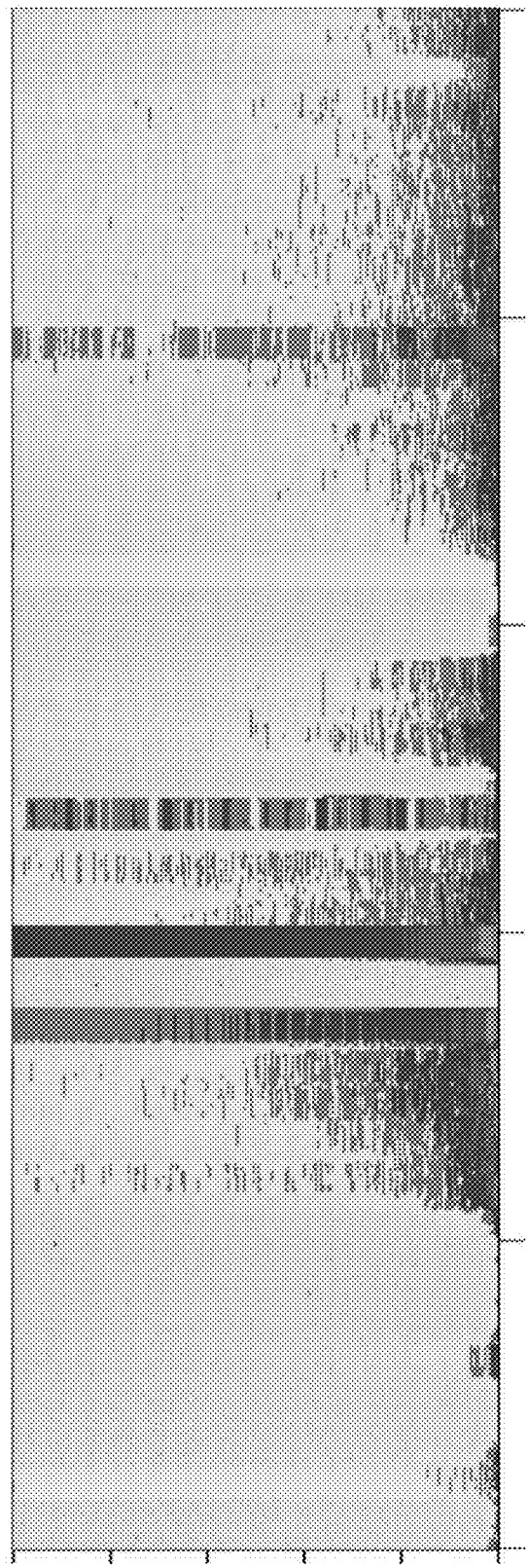

FIGS. 7A-E are one implementation of frequency domain decomposition of a monitored time series of performance data using spectrograms. In particular, FIG. 7A shows a memory usage metric 700A and FIG. 7B illustrates a zoomed in few of a particular time window 700B in the memory usage metric 700A. FIG. 7C is an output of cosine distance of spectrogram transformation 700C of the monitored time series. FIG. 7D is a wavelet analysis 700D that generates a time-frequency domain decomposition of the monitored time series.

Figure 7E:
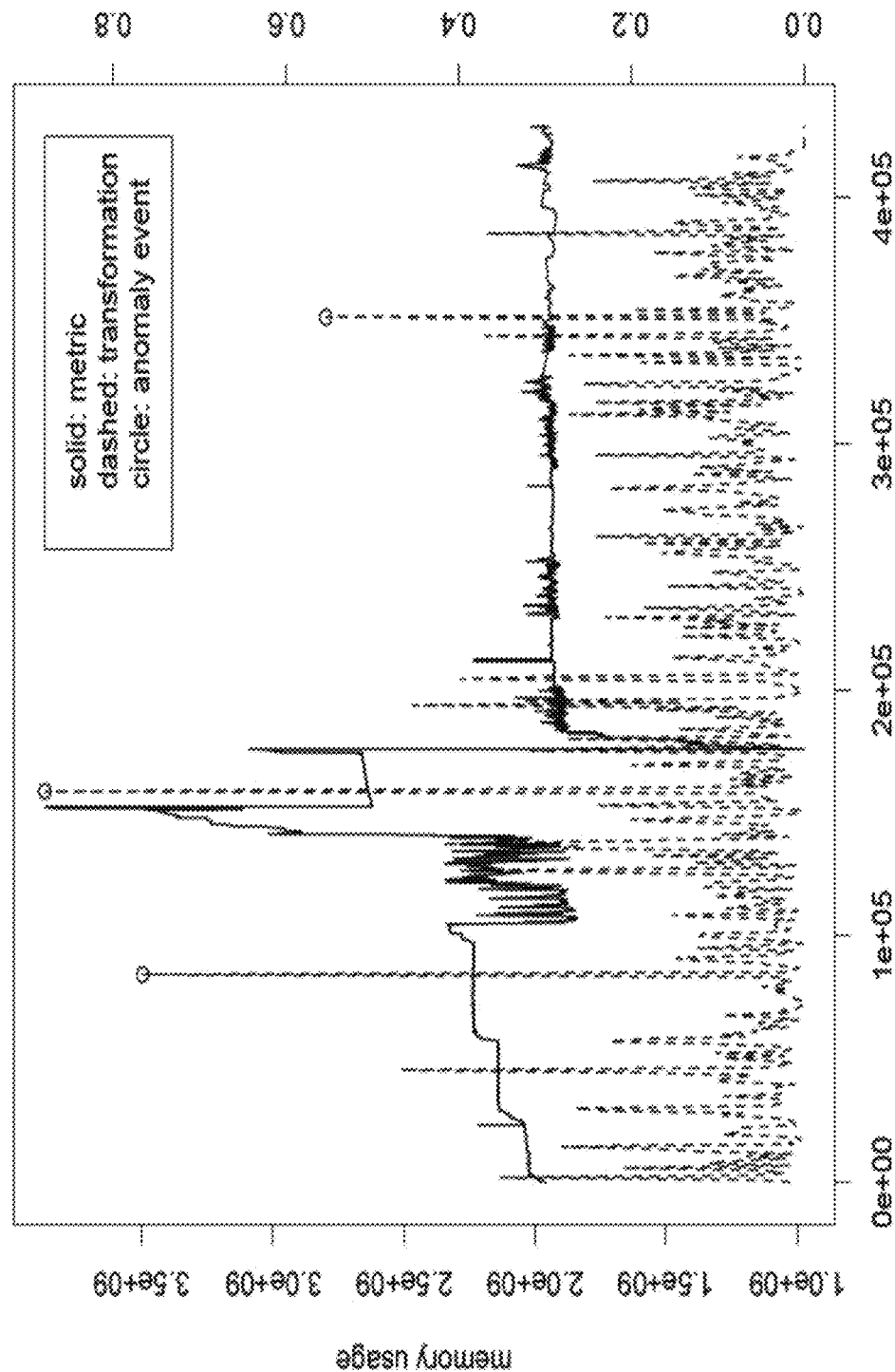

FIG. 7E is an output 700E of spectrogram cosine distance test generated by thresholding cosine-similarity of frequency signature vectors from the frequency domain decomposition at two different time instances. The monitored time series is depicted with a solid line and the spectrogram transformation is illustrated using a dashed line. The anomalies are identified using circles.

An ARIMA model represents a time series using autoregressive terms, integration terms, and moving average terms. The autoregressive terms identify the importance of past values of a time series to the current value. The integration terms specify differences between values with their trend and drift removed. The moving average terms represent a moving average of the values with random noise removed. The ARIMA model may be represented as follows:

$$\mathrm{ARIMA}(p,d,q)$$

where:

p represents the number of autoregressive terms;

d represents the number of integration terms; and q represents the number of moving average terms. The number of these terms represents the order of the ARIMA model.

Figure 8:
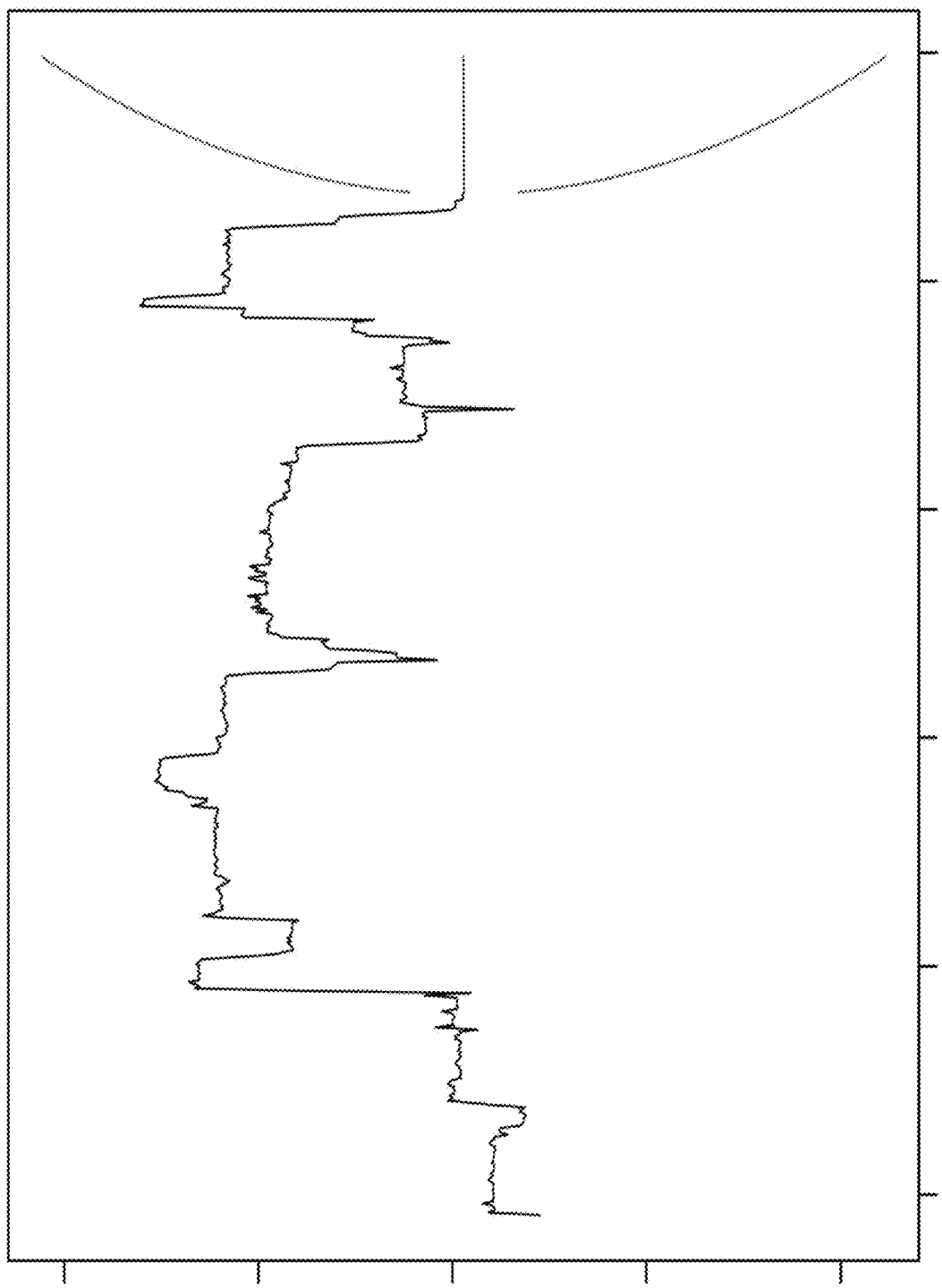
FIG. 8 illustrates one implementation of an autoregressive integrated moving average (ARIMA) noise model used to predict instances in a monitored time series of performance data.

In particular, FIG. 8 illustrates one implementation of an autoregressive integrated moving average (ARIMA) noise model 800 used to predict instances in a monitored time series of performance data. The predicted instances in the monitored time series are used to determine actual instances in the monitored time series that are predetermined deviations from values of the predicted instances. Instances with the predetermined deviations are identified as anomalies.

Figure 9:
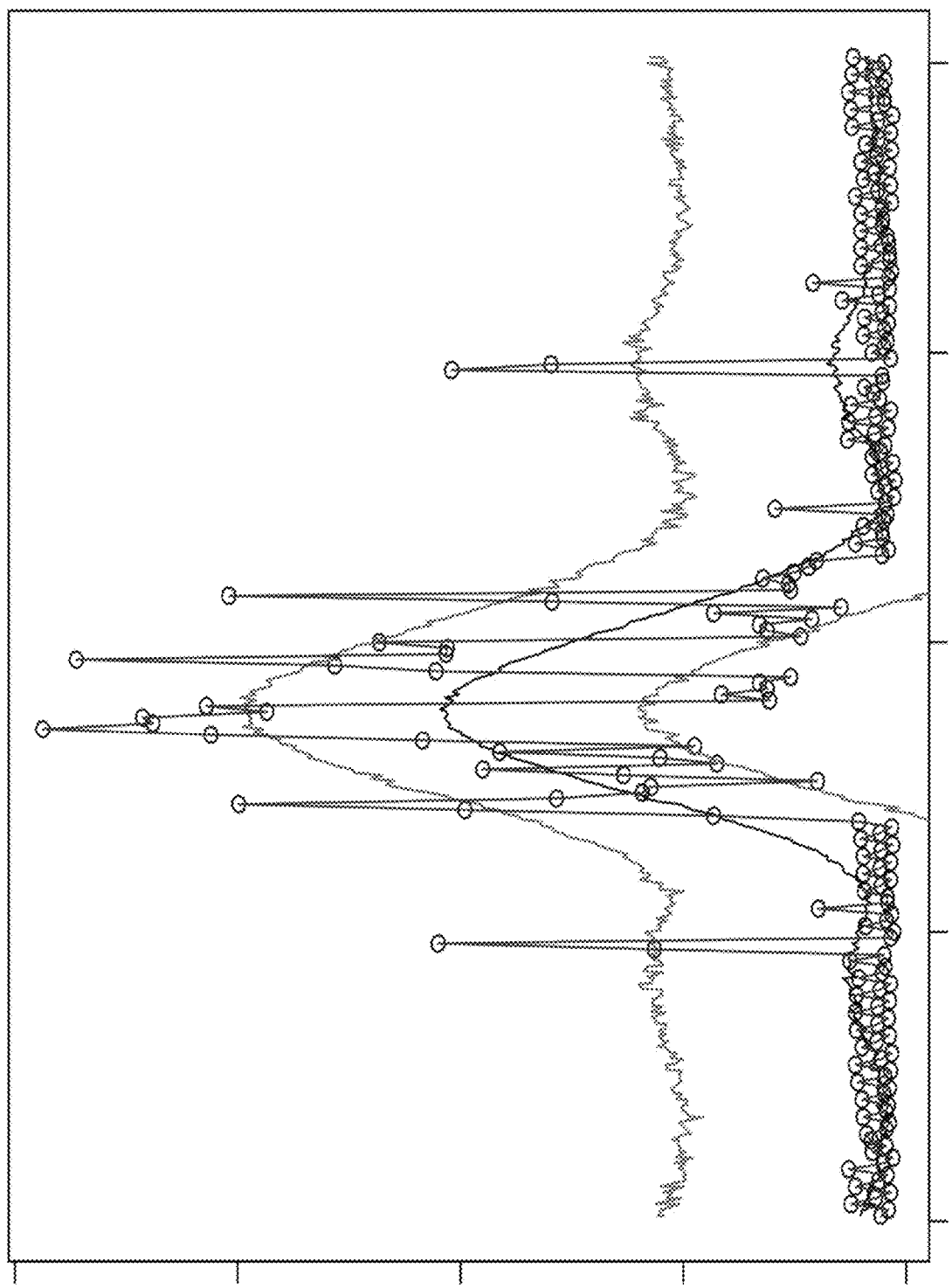
FIG. 9 is one implementation in which a monitored time series of performance data is treated as a Gaussian Process.

FIG. 9 is one implementation in which a monitored time series of performance data is treated as a Gaussian Process. In graph 900, deviations from a mean outcome of the Gaussian Process are used to identify specific instances as anomalies.

Figure 10B:
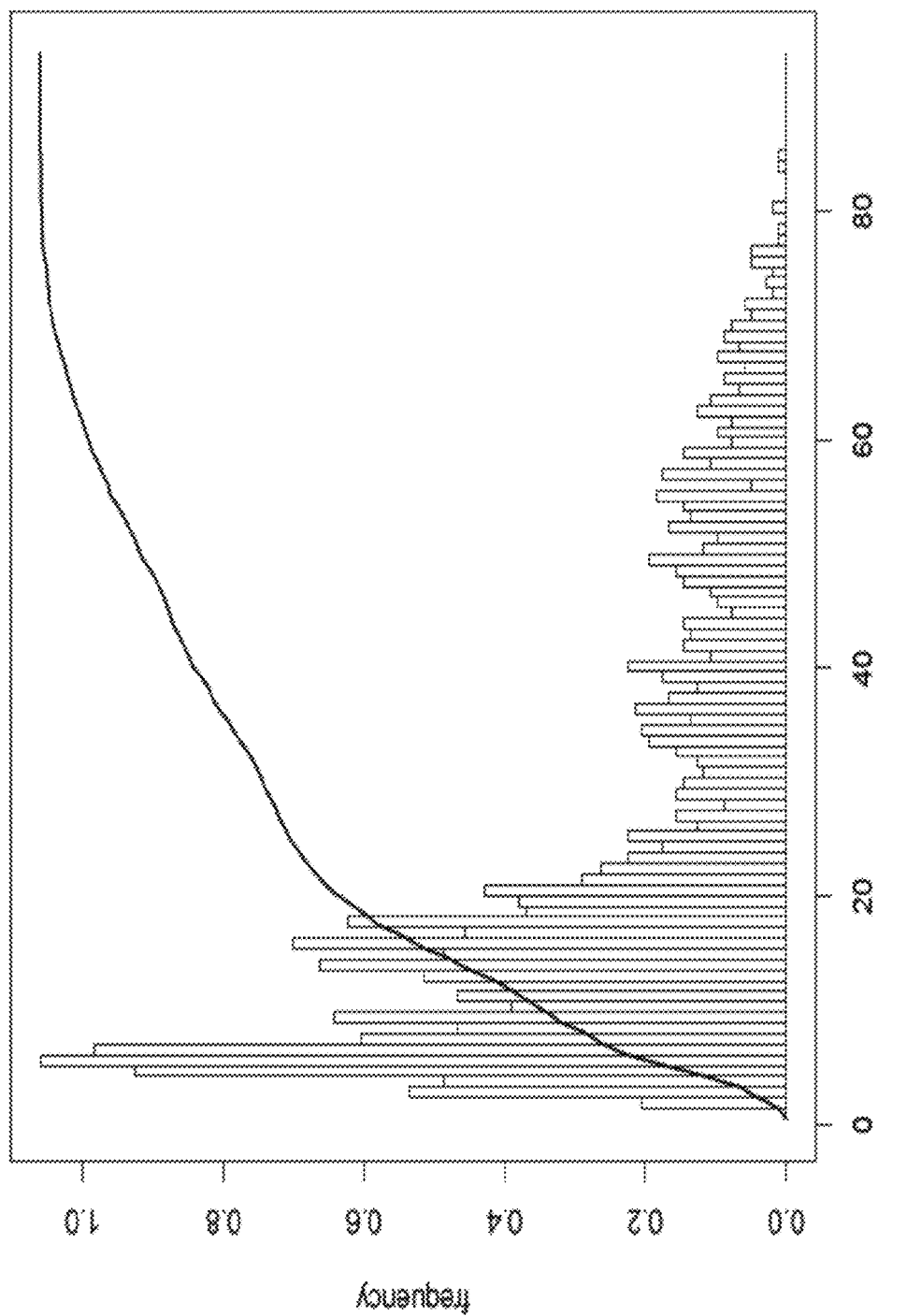
Figure 10C:
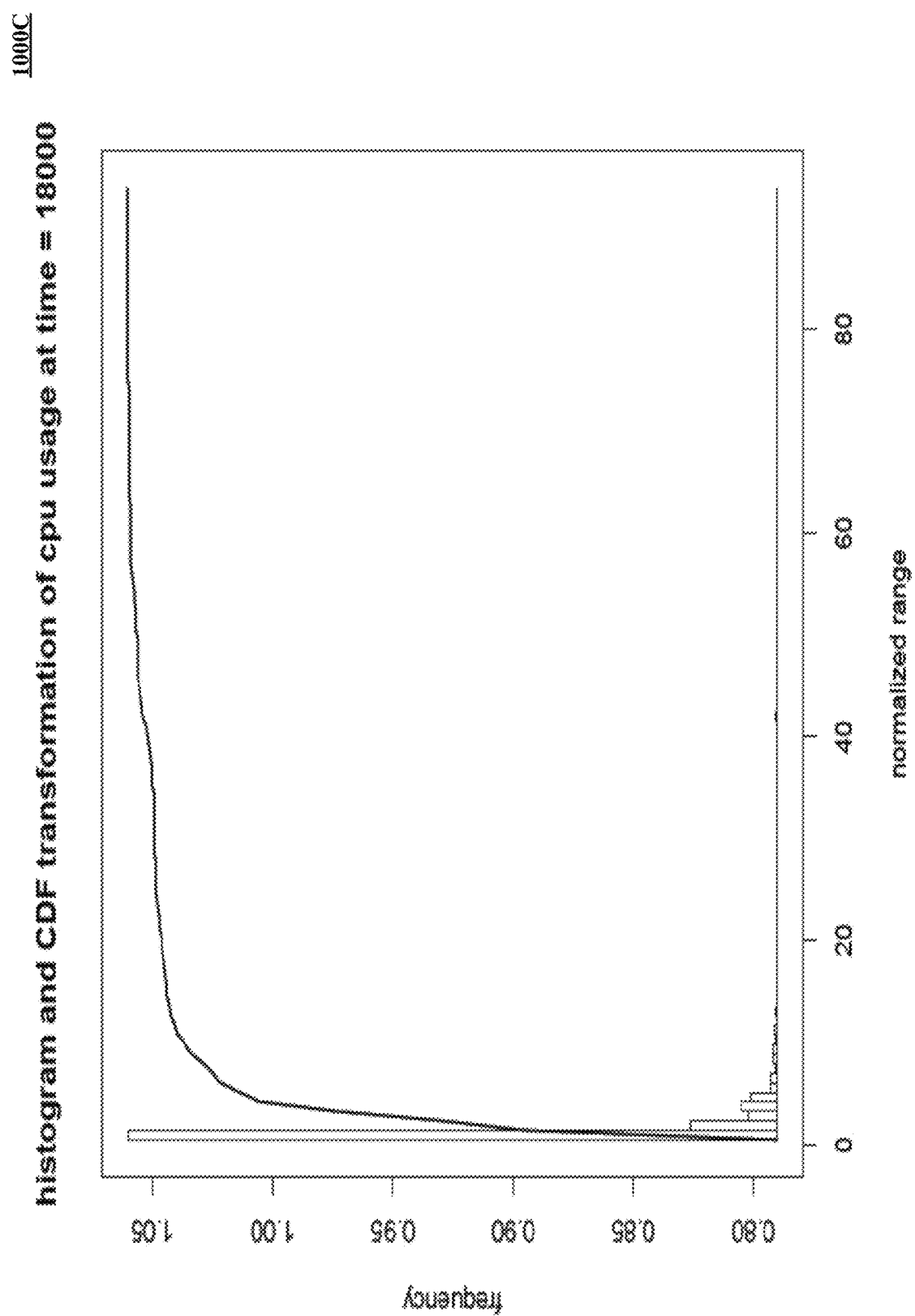

FIGS. 10A-D depict one implementation of using a non-parametric test to identify a set of instances in a monitored time series of performance data. In FIG. 10A, a set of instances in the monitored time series within a predetermined time window are identified as an unordered set of random samples. In FIGS. 10B and 10C at least one of a histogram and an empirical cumulative density function (CDF) are estimated using random samples of different CPU usage values 1000B and 1000C.

Figure 10D:
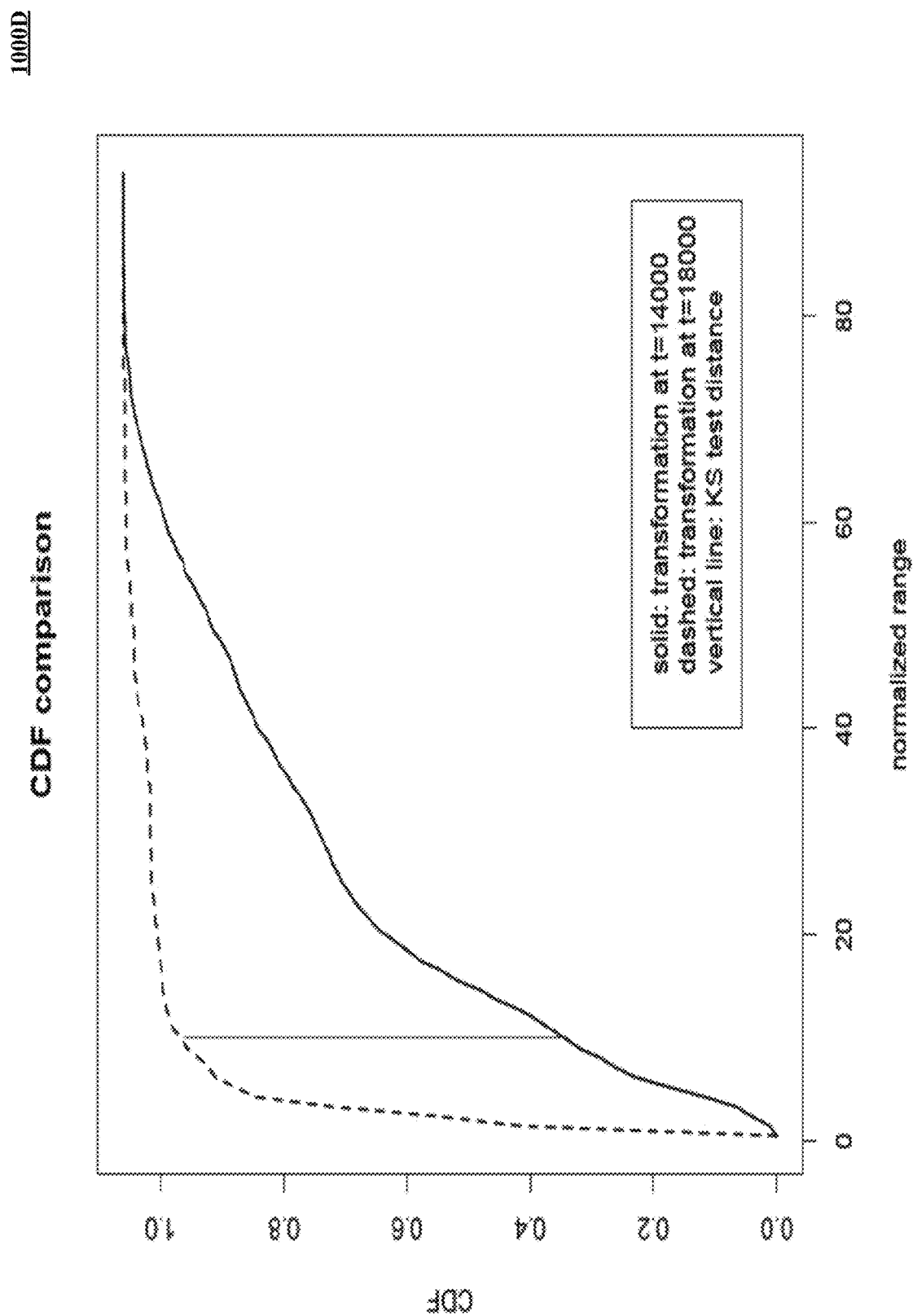

In FIG. 10D, comparison 1000D is made between empirical CDFs of at least two or more time-varying instances between the random samples and a similarity of underlying probability distribution between the time-varying instances is determined using two-sided Kolmogorov-Smirnov (KS) test. In addition, in FIG. 10D, anomalies in the monitored time series are by thresholding a KS distance that marks predetermined deviations as change points.

In yet other implementations different parametric and non-parametric circumstance-specific detectors can be used. Examples include the Cramer-von Mises test that compares the similarity of CDFs, Siegel-Tukey test that compares dispersion similarity of two distributions, median test that compares the medians of two populations, Pearson's Chi-squared test used to compare the distributions of two categorical random variables, sign test is used to compare the median of the differences to zero, Wilcoxon signed rank test used as a generalization of the Sign test difference of population mean ranks, and a paired version of the Student's t-test used to test difference between two distributions.

Figure 11:
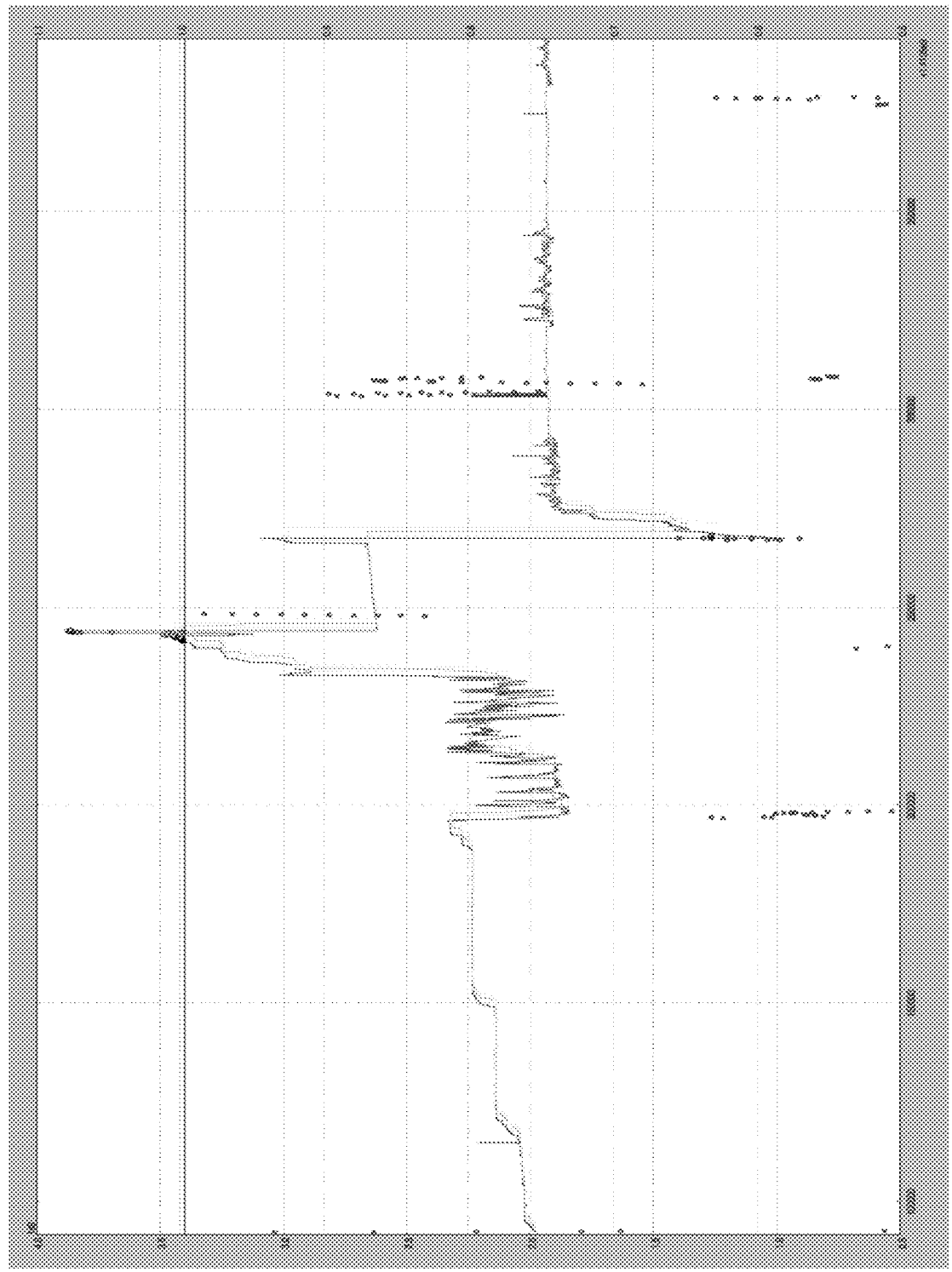
FIG. 11 shows one implementation of anomaly detection in a memory usage metric.
Figure 12:
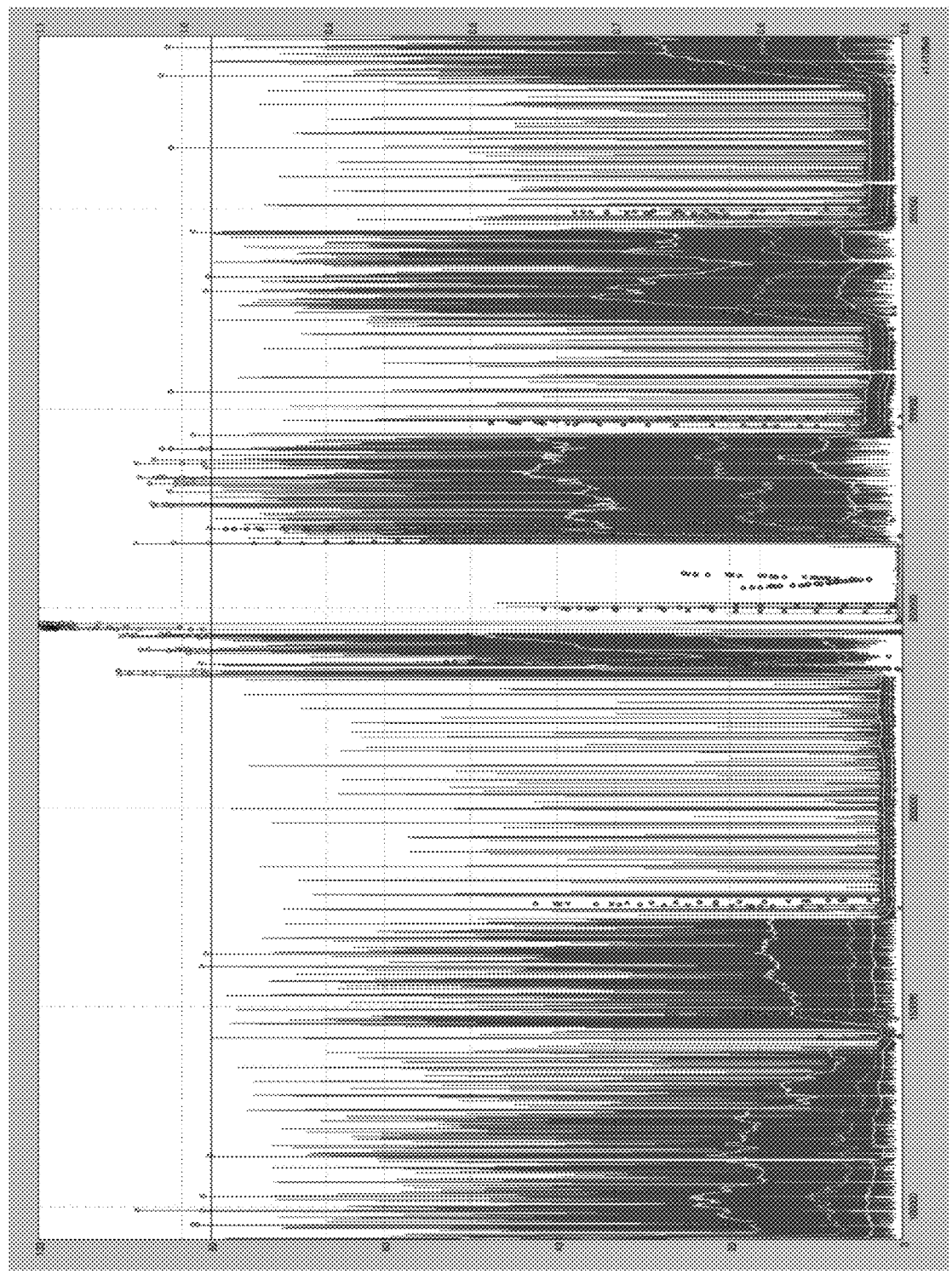
FIG. 12 illustrates one implementation of anomaly detection in a central processing unit (CPU) usage metric.
Figure 13:
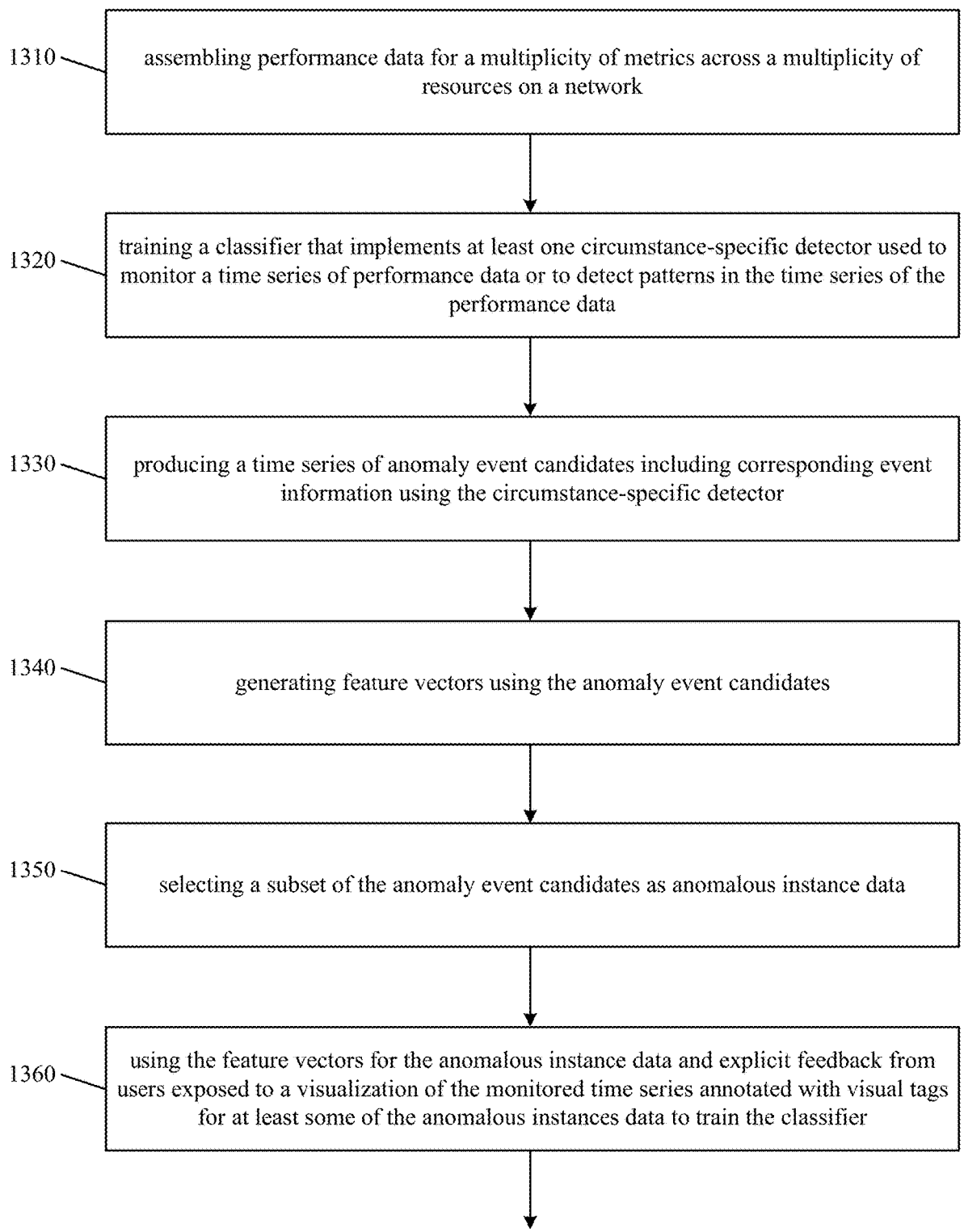
FIG. 13 shows one implementation of a flowchart of learning how to efficiently display anomalies in performance data to an operator using explicit feedback.

FIG. 11 shows one implementation of anomaly detection 1100 in a memory usage metric. FIG. 12 illustrates one implementation of anomaly detection 1200 in a central CPU usage metric. In both FIGS. 11 and 12, blue lines indicate a monitored time series for the memory usage metric. Green and yellow lines are transformed observations. Red circles indicate the anomalous observations identified by the circumstance-specific detectors. As a comparison, the observations marked by traditional static threshold methods are shown with yellow circles along with the thresholding line in black. Attention should be paid to the fact that in both cases a number of anomalous behaviors such as sharp drops and frequency changes are completely missed by the static threshold method. Furthermore, in some implementations, multiple anomalies may be detected around each change boundary. These anomalies can be clustered into logical groups that represent that boundaries, and reduce the amount of information that needs to be consumed by the user or a downstream system such as an anomaly correlation system. Flowcharts FIG. 13 shows one implementation of a flowchart 1300 of learning how to efficiently display anomalies in performance data to an operator using explicit feedback. Flowchart 1300 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 13. Multiple actions can be combined in some implementations. For convenience, this workflow is described with reference to the system that carries out a method. The system is not necessarily part of the method.

At action 1310, the method includes assembling performance data for a multiplicity of metrics across a multiplicity of resources on a network, as described supra.

At action 1320, the method includes training a classifier that implements at least one circumstance-specific detector used to monitor a time series of performance data or to detect patterns in the time series of the performance data, as described supra.

At action 1330, the method includes producing a time series of anomaly event candidates including corresponding event information using the circumstance-specific detector, as described supra.

At action 1340, the method includes generating feature vectors using the anomaly event candidates, as described supra.

At action 1350, the method includes selecting a subset of the anomaly event candidates as anomalous instance data, as described supra.

At action 1360, the method includes using the feature vectors for the anomalous instance data and explicit feedback from users exposed to a visualization of the monitored time series annotated with visual tags for at least some of the anomalous instances data to train the classifier, as described supra.

In one implementation, the monitored time series or patterns in the monitored time series identify at least start times of anomalous performances of the resources within a predetermined time period.

In another implementation, the monitored time series or patterns in the monitored time series identify at least end times of anomalous performances of the resources within a predetermined time period.

In yet another implementation, the circumstance-specific detector includes a trend model that represents trend functions of the monitored time series. In some implementations, the method includes testing the trend model for trend changes by thresholding the trend model over derivative changes of the trend model.

In one implementation, the circumstance-specific detector includes a periodic model that represents periodic variations in the monitored time series. In some implementations, the method includes testing the periodic model for periodicity changes by identifying intervals between consecutive instances in the monitored time series.

In one implementation, the circumstance-specific detector includes a noise model that represents random or systematic fluctuations in the monitored time series. In some implementations, the method includes testing the noise model for outliers by identifying deviations from trend and periodicity of the monitored time series.

In one implementation, the circumstance-specific detector includes a weighted moving average that estimates a smoothed average of values in the monitored time series. In some implementations, the method includes using the smoothed average to determine instances in the monitored time series that fall a predetermined multiple of standard deviation away from the smoothed average and identifying the instances as anomalies.

In one implementation, the circumstance-specific detector includes an exponentially weighted average that estimates a smoothed average of the monitored time series. In some implementations, the method includes using the smoothed average to determine instances in the monitored time series that fall a predetermined multiple of standard deviations away from the smoothed average and identifying the instances as anomalies.

In one implementation, the circumstance-specific detector includes an autoregressive moving average (ARMA) to predict instances in the monitored time series. In some implementations, the method includes using the predicted instances in the monitored time series to determine actual instances in the monitored time series that are predetermined deviations from values of the predicted instances and identifying the instances with the predetermined deviations as anomalies.

In one implementation, the circumstance-specific detector includes an autoregressive integrated moving average (ARIMA) to predict instances in the monitored time series. In some implementations, the method includes using the predicted instances in the monitored time series to determine actual instances in the monitored time series that are predetermined deviations from values of the predicted instances and identifying the instances with the predetermined deviations as anomalies.

In one implementation, the circumstance-specific detector includes a Hidden Markov Model (HMM) that infers stage changes in the monitored time series and identifies at least some state changes as anomalies.

In another implementation, the circumstance-specific detector treats instances in the monitored times series as a Gaussian Process and uses deviations from a mean outcome of the Gaussian Process to identify specific instances as anomalies.

In yet another implementation, the circumstance-specific detector generates a frequency domain decomposition of the monitored time series. In some implementations, the method includes detecting anomalies by thresholding cosine-similarity of frequency signature vectors from the frequency domain decomposition at two different time instances.

In one implementation, the circumstance-specific detector is a wavelet analysis that generates a time-frequency domain decomposition of the monitored time series. In some implementations, the method includes detecting anomalies by thresholding cosine-similarity of time-frequency signature vectors at two different time instances. In other implementations, the method includes identifying a set of instances in the monitored time series within a predetermined time window as an unordered set of random samples, estimating at least one of a histogram and an empirical cumulative density function (CDF) using the random samples, comparing empirical CDFs of at least two or more time-varying instances and determining similarity of underlying probability distribution between the time-varying instances using two-sided Kolmogorov-Smirnov (KS) test and determining anomalies in the monitored time series by thresholding a KS distance that marks predetermined deviations as change points.

In one implementation, the multiplicity of metrics includes at least one of system level metrics, including at least one of central processing unit (CPU) usage, disk usage, memory usage, process fork rate, network usage and system load.

In another implementation, the multiplicity of metrics includes at least one of service level metrics central processing unit (CPU) usage, disk usage, memory usage, process fork rate, network usage and system load.

In yet another implementation, the multiplicity of metrics include at least one of service level metrics, including at least one of system service level agreements (SLAs), Hadoop block read latency, MongoDB read latency and Nginx requests per second.

In some implementations, the method further includes using the explicit feedback from users further includes receiving at least one of emoticons, likes, stars, thumbs up, bonuses, ratings and badges corresponding to a time series of feature vectors.

In one implementation, the event information identifies a recognized circumstance-specific detector that produced the time series of anomaly event candidates.

In another implementation, the event information identifies at least one metric for which the time series of anomaly event candidates were produced.

In yet another implementation, the event information identifies at least one resource on which the anomaly event candidates occurred.

In further implementation, the event information includes a score associated with the anomaly event candidates that specifies a likelihood of the anomaly event candidates qualifying as anomalous instance data.

In some implementations, the method includes using the feature vectors to identify interrelated anomaly event candidates based on at least one common time-window within which the anomaly event candidates were detected.

In other implementations, the method includes using the feature vectors to identify interrelated anomaly event candidates based on at least one common metric for which the anomaly event candidates were detected.

In some other implementations, the method includes using the feature vectors to identify interrelated anomaly event candidates based on at least one common resource on which the anomaly event candidates occurred.

In yet other implementations, the method includes using the feature vectors to identify interrelated anomaly event candidates based on at least two or more connected metrics on which two or more respective anomaly event candidates were detected.

In further implementations, the method includes using the feature vectors to identify interrelated anomaly event candidates based on at least two or more connected resources on which two or more respective anomaly event candidates occurred.

Figure 14:
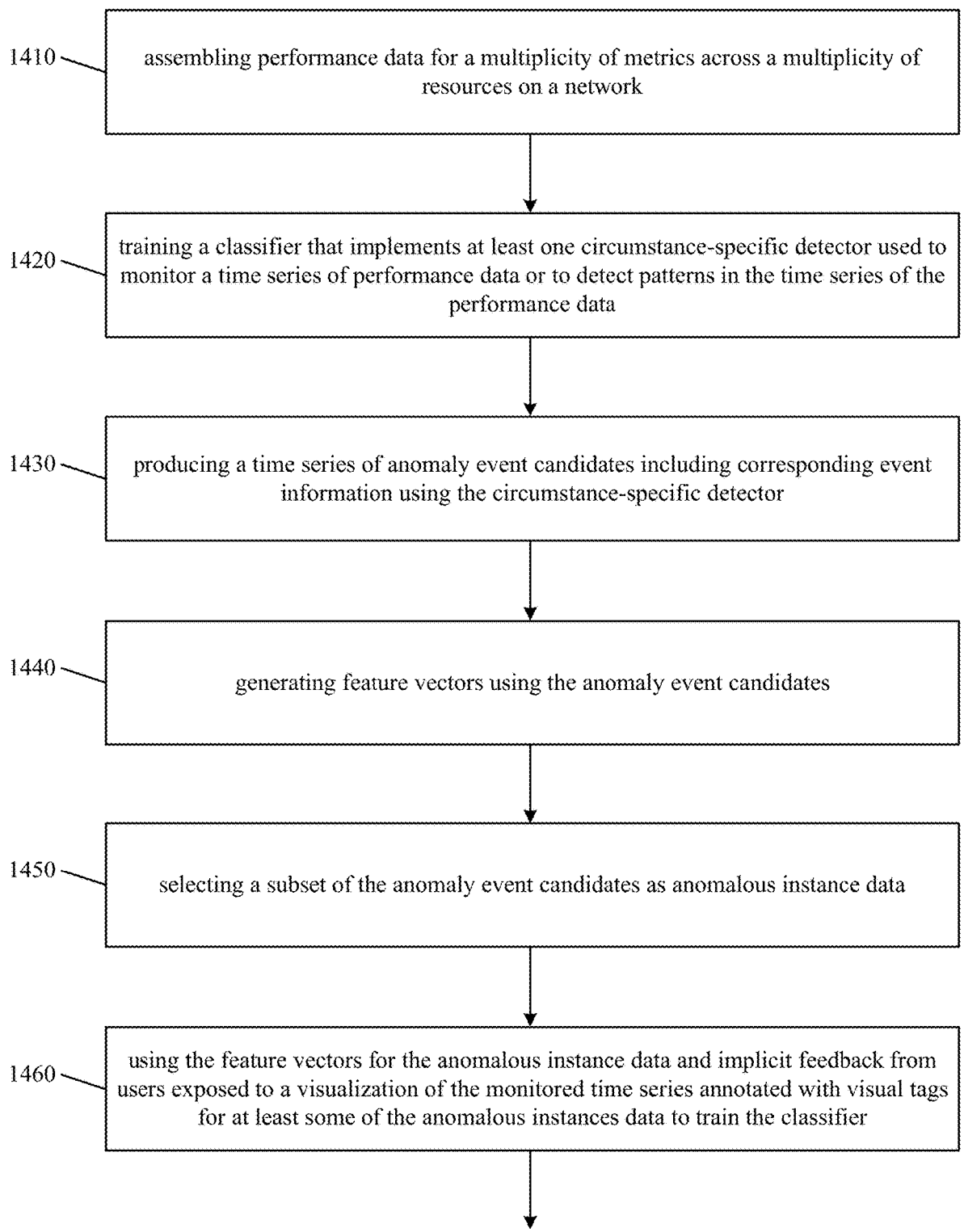
FIG. 14 illustrates one implementation of a flowchart of learning how to efficiently display anomalies in performance data to an operator using implicit feedback.

FIG. 14 shows one implementation of a flowchart 1400 of learning how to efficiently display anomalies in performance data to an operator using implicit feedback. Flowchart 1400 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 14. Multiple actions can be combined in some implementations. For convenience, this workflow is described with reference to the system that carries out a method. The system is not necessarily part of the method.

At action 1410, the method includes assembling performance data for a multiplicity of metrics across a multiplicity of resources on a network, as described supra.

At action 1420, the method includes training a classifier that implements at least one circumstance-specific detector used to monitor a time series of performance data or to detect patterns in the time series of the performance data, as described supra.

At action 1430, the method includes producing a time series of anomaly event candidates including corresponding event information using the circumstance-specific detector, as described supra.

At action 1440, the method includes generating feature vectors using the anomaly event candidates, as described supra.

At action 1450, the method includes selecting a subset of the anomaly event candidates as anomalous instance data, as described supra.

At action 1460, the method includes using the feature vectors for the anomalous instance data and implicit feedback from users exposed to a visualization of the monitored time series annotated with visual tags for at least some of the anomalous instances data to train the classifier, as described supra.

In one implementation, the monitored time series or patterns in the monitored time series identify at least start times of anomalous performances of the resources within a predetermined time period.

In another implementation, the monitored time series or patterns in the monitored time series identify at least end times of anomalous performances of the resources within a predetermined time period.

In yet another implementation, the circumstance-specific detector includes a trend model that represents trend functions of the monitored time series. In some implementations, the method includes testing the trend model for trend changes by thresholding the trend model over derivative changes of the trend model.

In one implementation, the circumstance-specific detector includes a periodic model that represents periodic variations in the monitored time series. In some implementations, the method includes testing the periodic model for periodicity changes by identifying intervals between consecutive instances in the monitored time series.

In one implementation, the circumstance-specific detector includes a noise model that represents random or systematic fluctuations in the monitored time series. In some implementations, the method includes testing the noise model for outliers by identifying deviations from trend and periodicity of the monitored time series.

In one implementation, the circumstance-specific detector includes a weighted moving average that estimates a smoothed average of values in the monitored time series. In some implementations, the method includes using the smoothed average to determine instances in the monitored time series that fall a predetermined multiple of standard deviation away from the smoothed average and identifying the instances as anomalies.

In one implementation, the circumstance-specific detector includes an exponentially weighted average that estimates a smoothed average of the monitored time series. In some implementations, the method includes using the smoothed average to determine instances in the monitored time series that fall a predetermined multiple of standard deviations away from the smoothed average and identifying the instances as anomalies.

In one implementation, the circumstance-specific detector includes an autoregressive moving average (ARMA) to predict instances in the monitored time series. In some implementations, the method includes using the predicted instances in the monitored time series to determine actual instances in the monitored time series that are predetermined deviations from values of the predicted instances and identifying the instances with the predetermined deviations as anomalies.

In one implementation, the circumstance-specific detector includes an autoregressive integrated moving average (ARIMA) to predict instances in the monitored time series. In some implementations, the method includes using the predicted instances in the monitored time series to determine actual instances in the monitored time series that are predetermined deviations from values of the predicted instances and identifying the instances with the predetermined deviations as anomalies.

In one implementation, the circumstance-specific detector includes a Hidden Markov Model (HMM) that infers stage changes in the monitored time series and identifies at least some state changes as anomalies.

In another implementation, the circumstance-specific detector treats instances in the monitored times series as a Gaussian Process and uses deviations from a mean outcome of the Gaussian Process to identify specific instances as anomalies.

In yet another implementation, the circumstance-specific detector generates a frequency domain decomposition of the monitored time series. In some implementations, the method includes detecting anomalies by thresholding cosine-similarity of frequency signature vectors from the frequency domain decomposition at two different time instances.

In one implementation, the circumstance-specific detector is a wavelet analysis that generates a time-frequency domain decomposition of the monitored time series. In some implementations, the method includes detecting anomalies by thresholding cosine-similarity of time-frequency signature vectors at two different time instances. In other implementations, the method includes identifying a set of instances in the monitored time series within a predetermined time window as an unordered set of random samples, estimating at least one of a histogram and an empirical cumulative density function (CDF) using the random samples, comparing empirical CDFs of at least two or more time-varying instances and determining similarity of underlying probability distribution between the time-varying instances using two-sided Kolmogorov-Smirnov (KS) test and determining anomalies in the monitored time series by thresholding a KS distance that marks predetermined deviations as change points.

In one implementation, the multiplicity of metrics includes at least one of system level metrics, including at least one of central processing unit (CPU) usage, disk usage, memory usage, process fork rate, network usage and system load.

In another implementation, the multiplicity of metrics includes at least one of service level metrics central processing unit (CPU) usage, disk usage, memory usage, process fork rate, network usage and system load.

In yet another implementation, the multiplicity of metrics include at least one of service level metrics, including at least one of system service level agreements (SLAs), Hadoop block read latency, MongoDB read latency and Nginx requests per second.

In some implementations, the method further includes using the implicit feedback from users further includes capturing users' navigation actions during evaluation of a ranked list of anomalies generated using a time series of feature vectors.

In other implementations, the method further includes using the implicit feedback from users further includes determining users' attention duration to respective anomalies during evaluation of a ranked list of anomalies generated using a time series of feature vectors.

In one implementation, the event information identifies a recognized circumstance-specific detector that produced the time series of anomaly event candidates.

In another implementation, the event information identifies at least one metric for which the time series of anomaly event candidates were produced.

In yet another implementation, the event information identifies at least one metric for which the time series of anomaly event candidates were produced.

In yet another implementation, the event information identifies at least one resource on which the anomaly event candidates occurred.

In further implementation, the event information includes a score associated with the anomaly event candidates that specifies a likelihood of the anomaly event candidates qualifying as anomalous instance data.

In some implementations, the method includes using the feature vectors to identify interrelated anomaly event candidates based on at least one common time-window within which the anomaly event candidates were detected.

In other implementations, the method includes using the feature vectors to identify interrelated anomaly event candidates based on at least one common metric for which the anomaly event candidates were detected.

In some other implementations, the method includes using the feature vectors to identify interrelated anomaly event candidates based on at least one common resource on which the anomaly event candidates occurred.

In yet other implementations, the method includes using the feature vectors to identify interrelated anomaly event candidates based on at least two or more connected metrics on which two or more respective anomaly event candidates were detected.

In further implementations, the method includes using the feature vectors to identify interrelated anomaly event candidates based on at least two or more connected resources on which two or more respective anomaly event candidates occurred.

Computer System

Figure 15:
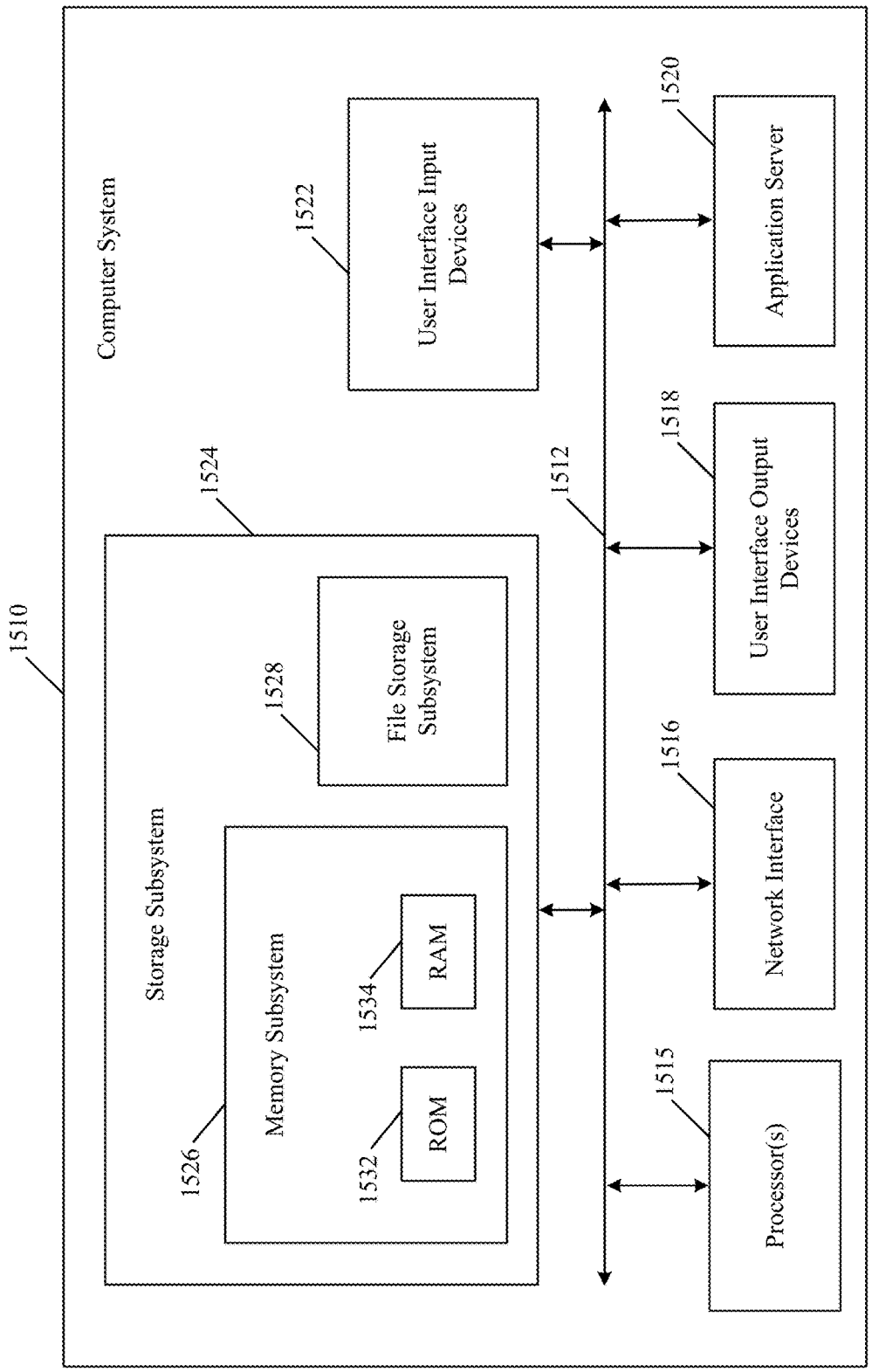
FIG. 15 is a block diagram of an example computer system used to detect anomalies by circumstance-specific detectors.

FIG. 15 is a block diagram of an example computer system 1500 used to detect anomalies by circumstance-specific detectors. Computer system 1510 typically includes at least one processor 1515 that communicates with a number of peripheral devices via bus subsystem 1512. These peripheral devices can include a storage subsystem 1524 including, for example, memory devices and a file storage subsystem, user interface input devices 1522, user interface output devices 1520, and a network interface subsystem 1516. The input and output devices allow user interaction with computer system 1510. Network interface subsystem 1516 provides an interface to outside networks, including an interface to corresponding interface devices in other computer systems.

User interface input devices 1522 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1510.

User interface output devices 1520 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1510 to the user or to another machine or computer system.

Storage subsystem 1524 stores programming and data constructs that provide the functionality of some or all of the modules and methods described herein. These software modules are generally executed by processor 1515 alone or in combination with other processors.

Memory 1526 used in the storage subsystem can include a number of memories including a main random access memory (RAM) 1530 for storage of instructions and data during program execution and a read only memory (ROM) 1532 in which fixed instructions are stored. A file storage subsystem 1528 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1528 in the storage subsystem 1524, or in other machines accessible by the processor.

Bus subsystem 1512 provides a mechanism for letting the various components and subsystems of computer system 1510 communicate with each other as intended. Although bus subsystem 1512 is shown schematically as a single bus, alternative implementations of the bus subsystem can use multiple busses.

Computer system 1510 can be of varying types including a workstation, server, computing cluster, blade server, server farm, or any other data processing system or computing device. Due to the ever-changing nature of computers and networks, the description of computer system 1510 depicted in FIG. 15 is intended only as one example. Many other configurations of computer system 1510 are possible having more or fewer components than the computer system depicted in FIG. 15.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A computer implemented method of selecting by one or more hardware processors executing computer instructions, a subset of anomalies from a performance data set for display, the method including the one or more hardware processors:
    assembling a performance data set from performance data for a multiplicity of metrics across a multiplicity of resources on a network; and
    using a trained machine learning classifier to automatically classify data from at least one circumstance-specific detector used to monitor a monitored time series of performance data or to detect patterns in the time series of the performance data to select from received performance data a subset consisting of anomalous ones for display, wherein the trained machine learning classifier has been trained by one or more hardware processors:
   automatically producing a time series of anomaly event candidates including corresponding event information using the circumstance-specific detector;
   automatically generating feature vectors using anomaly event candidates of the time series of anomaly event candidates;
   automatically selecting a subset of the anomaly event candidates as anomalous instance data; and
   automatically using the feature vectors for the anomalous instance data and user feedback from users exposed to a visualization of the monitored time series of performance data annotated with visual tags for at least some of the anomalous instances data to train the trained machine learning classifier; and
the one or more hardware processors displaying only the anomalies as distinguished by the trained machine learning classifier.

2. The method of claim 1, wherein the circumstance-specific detector includes a trend model that represents trend functions of the monitored time series.

3. The method of claim 1, wherein the circumstance-specific detector includes a periodic model that represents periodic variations in the monitored time series.

4. The method of claim 1, wherein the circumstance-specific detector includes a noise model that represents random or systematic fluctuations in the monitored time series.

5. The method of claim 1, wherein the circumstance-specific detector includes a weighted moving average that estimates a smoothed average of values in the monitored time series.

6. The method of claim 1, wherein the circumstance-specific detector includes an exponentially weighted average that estimates a smoothed average of the monitored time series.

7. The method of claim 1, wherein the circumstance-specific detector includes an autoregressive moving average (ARMA) to predict instances in the monitored time series.

8. The method of claim 1, wherein the circumstance-specific detector includes an autoregressive integrated moving average (ARIMA) to predict instances in the monitored time series.

9. The method of claim 1, wherein the circumstance-specific detector includes a Hidden Markov Model (HMM) that infers stage changes in the monitored time series and identifies at least some state changes as anomalies.

10. The method of claim 1, wherein the circumstance-specific detector treats instances in the monitored times series as a Gaussian Process and uses deviations from a mean outcome of the Gaussian Process to identify specific instances as anomalies.

11. The method of claim 1, wherein the circumstance-specific detector generates a frequency domain decomposition of the monitored time series.

12. The method of claim 1, wherein the circumstance-specific detector is a wavelet analysis that generates a time-frequency domain decomposition of the monitored time series.

13. The method of claim 1, further including:
   identifying a set of instances in the monitored time series within a predetermined time window as an unordered set of random samples;
   estimating at least one of a histogram and an empirical cumulative density function (CDF) using random samples from the unordered set of random samples;
   comparing empirical CDFs of at least two or more time-varying instances and determining similarity of underlying probability distribution between the time-varying instances using two-sided Kolmogorov-Smirnov (KS) test; and
   determining anomalies in the monitored time series by thresholding a KS distance that marks predetermined deviations as change points.

14. The method of claim 1, wherein the multiplicity of metrics includes at least one of a system level metrics and a service level metrics, including at least one of:
   central processing unit (CPU) usage;
   disk usage;
   memory usage;
   process fork rate;
   network usage;
   system load;
   system service level agreements (SLAs);
   Hadoop block read latency;
   MongoDB read latency; and
   Nginx requests per second.

15. The method of claim 1, further including using explicit feedback from users including receiving at least one of emoticons, likes, stars, thumbs up, bonuses, ratings, and badges corresponding to a time series of feature vectors.

16. The method of claim 1, further including using the feature vectors to identify interrelated anomaly event candidates based on at least:
   one common time-window within which the anomaly event candidates were detected;
   one common metric for which the anomaly event candidates were detected;
   one common resource on which the anomaly event candidates occurred;
   two or more connected metrics on which two or more respective anomaly event candidates were detected; and
   two or more connected resources on which two or more respective anomaly event candidates occurred.

17. The method of claim 1, wherein using the user feedback from users further includes capturing users navigation actions during evaluation of a ranked list of anomalies generated using a time series of feature vectors.

18. The method of claim 1, wherein using the user feedback from users further includes determining users' attention duration to respective anomalies during evaluation of a ranked list of anomalies generated using a time series of feature vectors.

19. A system including one or more processors coupled to memory loaded with computer instructions to select a subset of anomalies from a performance data set for display, which instructions, when executed on the processors, implement actions comprising:
   assembling a performance data set from performance data for a multiplicity of metrics across a multiplicity of resources on a network; and
   using a trained machine learning classifier to automatically classify data from at least one circumstance-specific detector used to monitor a time series of performance data or to detect patterns in the time series of the performance data to select from received performance data a subset consisting of anomalous ones for display, wherein the trained machine learning classifier has been trained by one or more hardware processors:
  automatically producing a time series of anomaly event candidates including corresponding event information using the circumstance-specific detector;
  automatically generating feature vectors using anomaly event candidates of the time series of anomaly event candidates;
  automatically selecting a subset of the anomaly event candidates as anomalous instance data; and
  using the feature vectors for the anomalous instance data and user feedback from users exposed to a visualization of the monitored time series annotated with visual tags for at least some of the anomalous instances data to train the trained machine learning classifier; and
the one or more hardware processors displaying on a display only anomalies as distinguished by the trained machine learning classifier.

20. A non-transitory computer readable storage medium impressed with computer program instructions to select a subset of anomalies from a performance data set for display, which instructions, when executed on one or more hardware processors, implement a method comprising:
  assembling a performance data set from performance data for a multiplicity of metrics across a multiplicity of resources on a network; and
  using a trained machine learning classifier to automatically classify data from at least one circumstance-specific detector used to monitor a time series of performance data or to detect patterns in the time series of the performance data to select from received performance data a subset consisting of anomalous ones for display, wherein the trained machine learning classifier has been trained by one or more hardware processors:
    automatically producing a time series of anomaly event candidates including corresponding event information using the circumstance-specific detector;
    automatically generating feature vectors using anomaly event candidates of the time series of anomaly event candidates;
    automatically selecting a subset of the anomaly event candidates as anomalous instance data; and
    using the feature vectors for the anomalous instance data and user feedback from users exposed to a visualization of the monitored time series annotated with visual tags for at least some of the anomalous instances data to train the trained machine learning classifier; and
  the one or more hardware processors displaying on a display only anomalies as distinguished by the trained machine learning classifier.

* * * * *